United States Patent
Gaudig et al.

(10) Patent No.: US 8,905,456 B2
(45) Date of Patent: Dec. 9, 2014

(54) PANEL-SHAPED PARTITION AND STORAGE DEVICE HAVING A PARTITION

(71) Applicant: Faurecia Innenraum Systeme GmbH, Hagenbach (DE)

(72) Inventors: Ralf Gaudig, Russelsheim (DE); Sebastian Wandtke, Heidelberg (DE); Martin Schulz, Karlsruhe (DE)

(73) Assignees: Faurecia Innenraum Systeme GmbH, Hagenbach (DE); Faurecia Interieur Industrie, Meru Cedex (FR)

( * ) Notice: Subject to any disclaimer, the term of this patent is extended or adjusted under 35 U.S.C. 154(b) by 6 days.

(21) Appl. No.: 13/728,453

(22) Filed: Dec. 27, 2012

(65) Prior Publication Data

US 2013/0187401 A1     Jul. 25, 2013

Related U.S. Application Data

(63) Continuation of application No. PCT/EP2011/003236, filed on Jun. 30, 2011.

(30) Foreign Application Priority Data

Jun. 30, 2010   (DE) .................. 10 2010 025 624
Jun. 30, 2010   (DE) .................. 10 2010 025 625

(51) Int. Cl.
B60N 3/10    (2006.01)
B60R 7/00    (2006.01)
B60R 7/04    (2006.01)
F16B 5/00    (2006.01)

(52) U.S. Cl.
CPC ............... B60R 7/005 (2013.01); B60N 3/108 (2013.01); B60R 7/04 (2013.01); F16B 5/00 (2013.01)
USPC ...................................... 296/37.8; 296/1.07

(58) Field of Classification Search
USPC ............ 296/37.8, 37.12, 37.13, 37.14, 37.15, 296/37.16, 1.07; 403/291
See application file for complete search history.

(56) References Cited

U.S. PATENT DOCUMENTS 5,170,980 A * 12/1992 Burrows et al. ............ 248/311.2
5,474,272 A * 12/1995 Thompson et al. ........ 248/311.2
(Continued)

FOREIGN PATENT DOCUMENTS

DE        9403833 U1  *  5/1994
DE    10200618895 A1    11/2006
(Continued)

OTHER PUBLICATIONS

European Patent Office, International Searching Authority, "International Preliminary Report on Patentability and Written Opinion" mailed Jan. 8, 2013; International Appln. No. PCT/EP2011/003236, filed Jun. 30, 2011.

Primary Examiner — Jason S Morrow
Assistant Examiner — E Turner Hicks
(74) Attorney, Agent, or Firm — Ingrassia Fisher & Lorenz, P.C.

(57) ABSTRACT

A panel-shaped partition in accordance with an embodiment is provided herein. The panel-shaped partition comprises two oppositely positioned lateral edge sections that are in the form of reinforced bearing axes (A) and an elastic panel-shaped carrier matrix that extends between the lateral edge sections in a longitudinal direction of the partition such that a wall section is formed. The partition features at least one flexurally rigid carrier matrix reinforcing device that is in the form of longitudinal profiles on or through the carrier matrix which extend transverse to the longitudinal direction of the partition to increase the flexural rigidity of the partition against bending moments, the moment axes of which extend transverse to the axial directions of the bearing axes, in comparison with the flexural rigidity of the carrier matrix.

13 Claims, 21 Drawing Sheets

(56) References Cited

U.S. PATENT DOCUMENTS

| | | |
|---|---|---|
| 5,839,710 A | 11/1998 | Hubbard |
| 6,264,154 B1 * | 7/2001 | Hiscox et al. ................. 248/313 |
| 6,427,605 B1 | 8/2002 | Heine et al. |
| 7,213,793 B2 * | 5/2007 | Sturt et al. ................. 248/311.2 |
| 2012/0138649 A1 * | 6/2012 | Kreis ........................... 224/483 |

FOREIGN PATENT DOCUMENTS

| | | | |
|---|---|---|---|
| GB | 2425293 A | * | 10/2006 |
| GB | 2466355 A | * | 6/2010 |
| JP | 10024770 A | | 1/1998 |
| JP | 2001171416 A | * | 6/2001 |

* cited by examiner

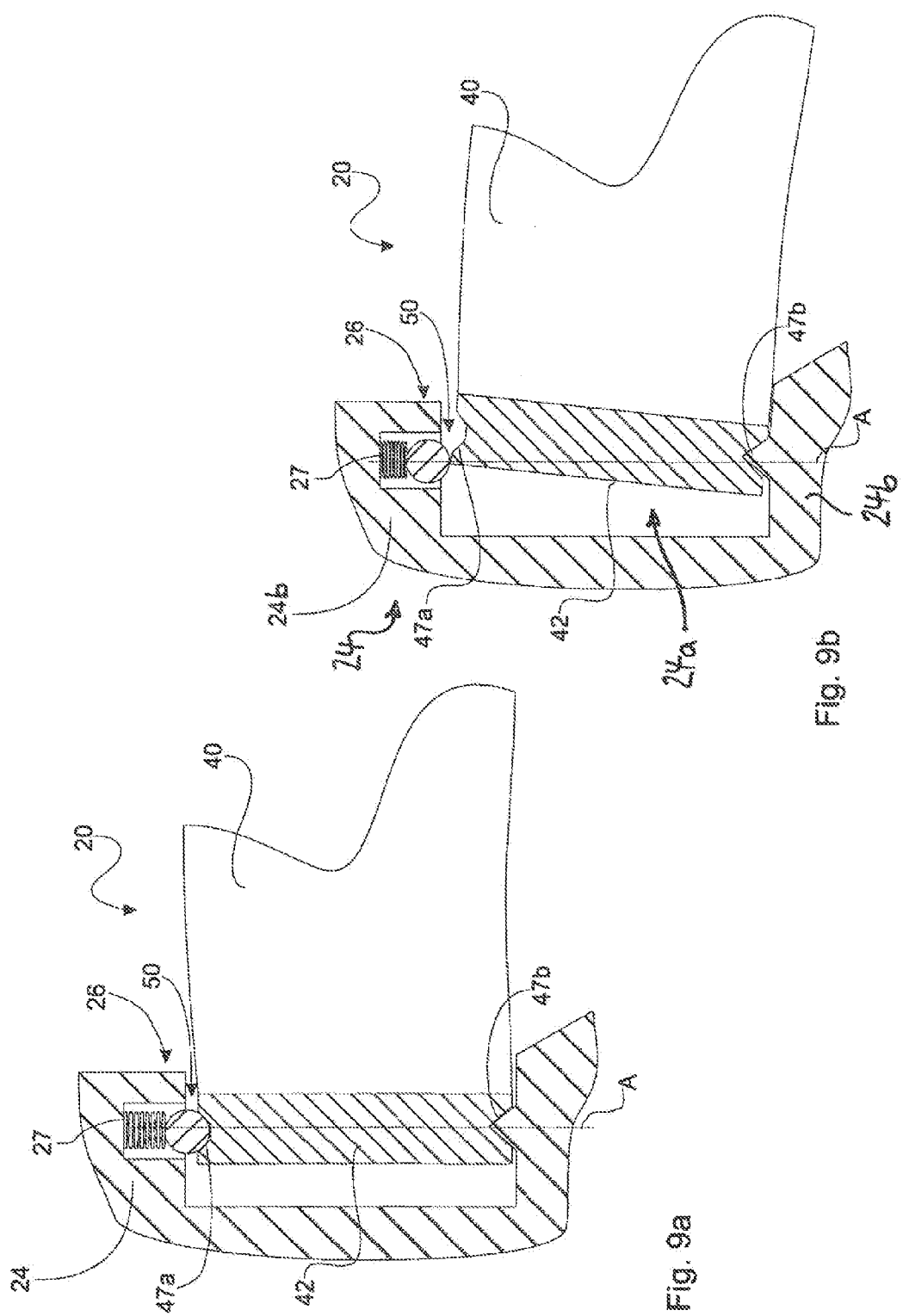

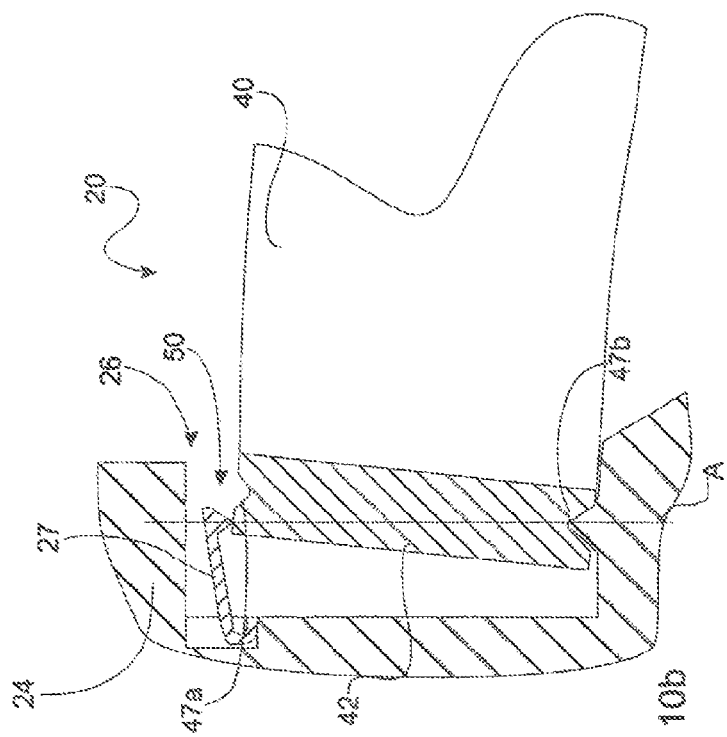
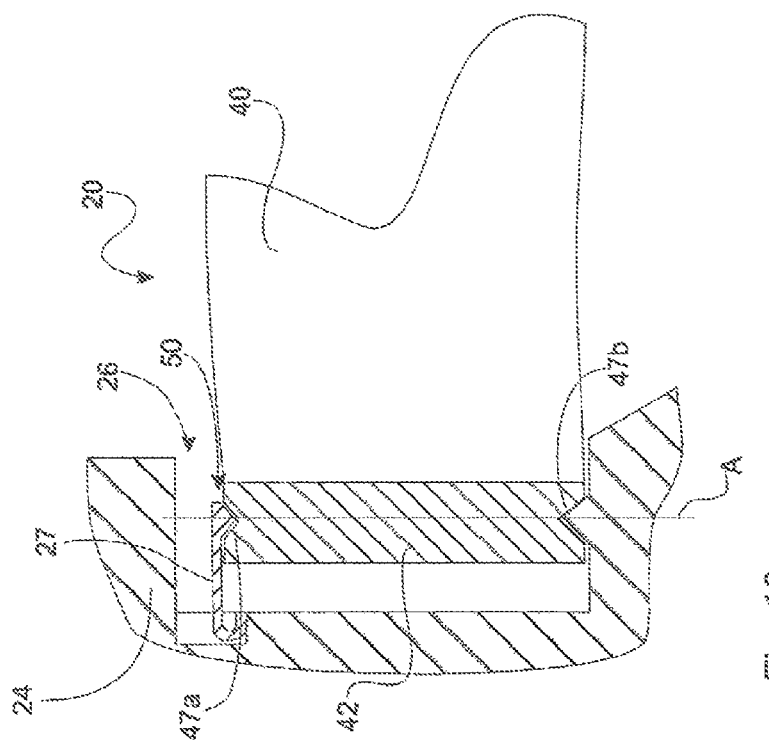

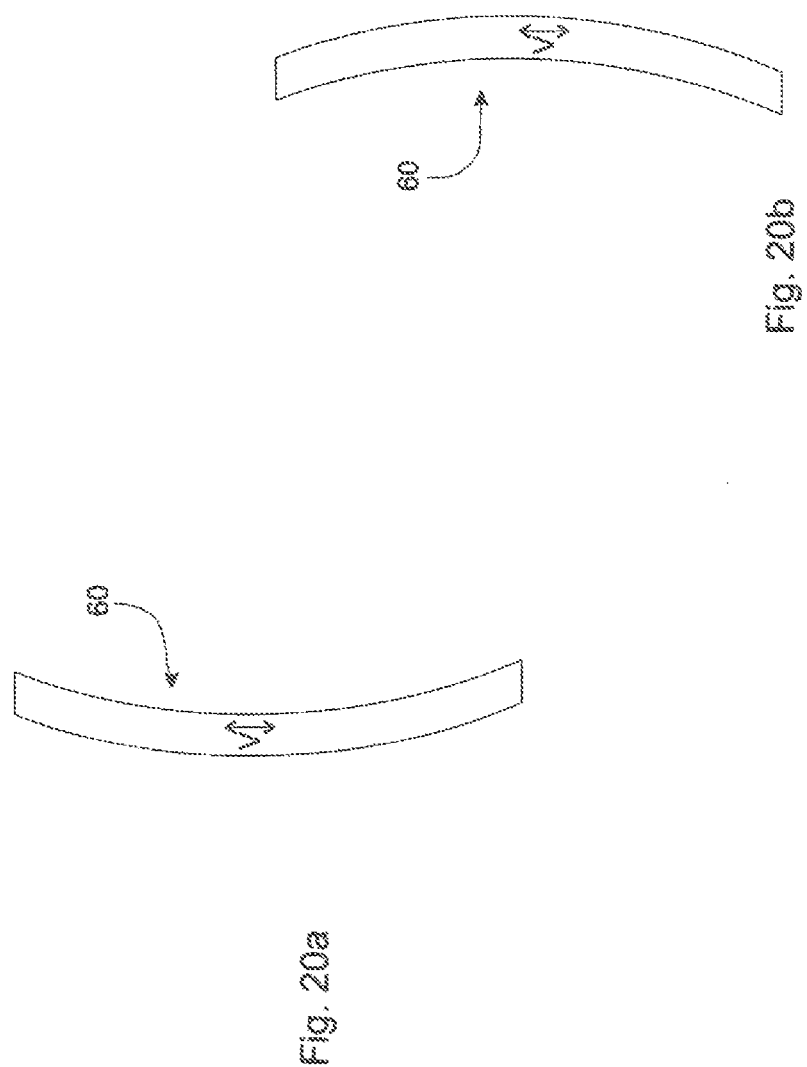

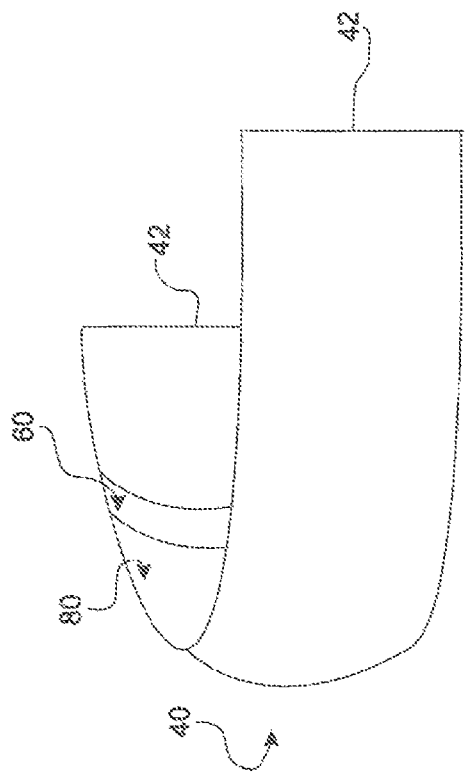
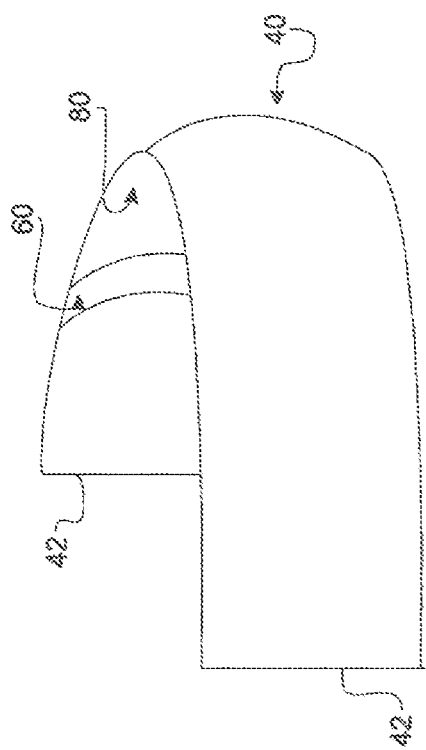

PANEL-SHAPED PARTITION AND STORAGE DEVICE HAVING A PARTITION

CROSS-REFERENCE TO RELATED APPLICATION

This is a continuation application claiming priority to International Application No. PCT/EP2011/003236, filed Jun. 30, 2011, which was published under PCT Article 21(2) and which claims priority to German Application No. 102010025624.2, filed Jun. 30, 2010 and German Application No. 102010025625.0 filed Jun. 30, 2010, which are all hereby incorporated in their entirety by reference.

TECHNICAL FIELD

The present invention pertains to a panel-shaped partition and a storage device having a partition, particularly for use in the passenger compartment of a vehicle.

BACKGROUND

Partitions of this type are generally known and used for creating dividers in storage devices that divide these storage devices into partial receptacle spaces. For example, different partial receptacle spaces for small utensils or partial receptacle spaces for beverage containers can be realized. Although known partitions basically have a certain flexibility due to a carrier matrix of plastic material, it is disadvantageous, however, that this flexibility not only can have positive effects, but also negative effects in all directions, in which the carrier matrix extends. If a beverage container is inserted into a partial receptacle space, for example, it would be possible that this beverage container cannot be adequately supported by the carrier matrix due to its elasticity. With known partitions, it is therefore necessary to make available a sufficiently large surface in order to ensure an adequate support of the beverage container despite the elasticity of the partition. This not only requires an increased material input, but also a larger structural shape that is usually difficult to justify in motor vehicles.

It is desirable to solve the above-described problems of known devices. The embodiment aims, in particular, to make available a partition and a storage device having such a partition that respectively can be realized with small structural dimensions and provide sufficient stability for accommodating small utensils, as well as larger utensils such as, for example, beverage containers.

The above-defined objective is attained with the characteristics of the independent claims. Advantageous embodiments result, in particular, from the dependent claims that refer to the respective independent claims.

SUMMARY

An embodiment proposes, in particular, a panel-shaped partition that features two oppositely positioned lateral edge sections that are realized in the form of reinforced bearing axes and an elastic panel-shaped carrier matrix that extends between the lateral edge sections in a longitudinal direction of the partition such that a wall section is formed. The partition features at least one flexurally rigid carrier matrix reinforcing device that is realized in the form of longitudinal profiles on or through the carrier matrix which extend transverse to the longitudinal direction of the partition in order to increase the flexural rigidity of the partition in comparison with the flexural rigidity of the carrier matrix, namely against bending moments, the moment axes of which extend transverse to the axial directions of the bearing axes or in the direction of the depth of the partition.

The elastic material of the panel-shaped carrier matrix has a modulus of elasticity, at which the regions of the carrier matrix that lie between the longitudinal profiles exert such a restoring force when they are deformed that the partition can assume at least two altogether stable deformation states with at least sectionally opposing curvature profiles when the lateral edge sections are inserted into bearing devices of an inner wall of a storage device in order to divide a receptacle space of the storage device into different sizes.

The embodiment proposes, in particular, a panel-shaped partition that is realized in an elastic fashion and features two oppositely positioned lateral edge sections that are realized in the form of reinforced bearing axes such that the partition can assume at least two stable deformation states with at least sectionally opposing curvature profiles when the lateral edge sections are inserted into bearing devices of an inner wall of a storage device in order to divide a receptacle space of the storage device, with the partition featuring:

a panel-shaped carrier matrix of elastic material that extends between the two oppositely positioned lateral edge sections realized in the form of reinforced bearing axes and at least one flexurally rigid carrier matrix reinforcing device that is frictionally connected to and arranged on the carrier matrix in such a way that the carrier matrix reinforcing device increases the flexural rigidity of the partition of the carrier matrix against bending moments that extend transverse to the axial directions of the bearing axes.

An inventive partition for use in a storage device in the passenger compartment of a vehicle in order to assume at least two stabile deformation states can, if accommodated in correspondingly provided bearing devices, be adjusted into deformation states with at least sectionally opposing curvature profiles in order to variably divide a receptacle space of the storage device into partial receptacle spaces. For this purpose, the partition features a panel-shaped carrier matrix and at least one carrier matrix reinforcing device. The panel-shaped carrier matrix is made of elastic material and features two oppositely positioned lateral edge sections or generally longitudinal edges that are realized in the form of reinforced bearing axes. In this case, the reinforcement of the bearing axes refers to a correspondence with the relevant bearing devices, in which the bearing axes are positioned during the utilization of the partition after its insertion into the storage device. In this case, the reinforcement is realized, in particular, against torsional moments, the torque vector of which is essentially directed transverse to the bearing axes.

The at least one carrier matrix reinforcing device has a greater flexural rigidity than the carrier matrix and is frictionally connected to the carrier matrix and arranged in such a way that the carrier matrix reinforcing device increases the flexural rigidity of the carrier matrix of the partition against bending moments that extend transverse to the axial directions of the axes. The provision of a carrier matrix reinforcing device and, in particular, its inventive alignment make it possible to manufacture a partition that has a sufficient elasticity for assuming at least two stable deformation states with at least sectionally opposing curvature profiles, but due to the reinforcement by means of the carrier matrix reinforcing device also has a sufficient stability in the direction extending perpendicular thereto, i.e., a sufficient stability against bending moments that essentially extend transverse or essentially perpendicular to the alignments of the longitudinal axes. This makes it possible to use significantly smaller partitions with increased stability such that a cost optimization is achieved in addition to material savings.

In this context, the term "frictionally connecting" refers to the connection between the carrier matrix and the carrier matrix reinforcing device being realized in such a way that a reinforcement is achieved by increasing the flexural rigidity of the partition in comparison with the flexural rigidity of the carrier matrix by means of the carrier matrix reinforcing device. Consequently, bending moments that engage in regions of the carrier matrix that are not in direct contact with the carrier matrix reinforcing device can be transmitted to the carrier matrix reinforcing device by the material of the panel-shaped carrier matrix and the frictional connection. Local carrier matrix reinforcing devices therefore also serve for increasing the flexural rigidity against bending moments that extend transverse to the axial directions of the longitudinal axes, namely with respect to bending moments that engage on the entire surface of the carrier matrix. It would advantageously also be possible to utilize the carrier matrix reinforcing device for reinforcing the oppositely positioned longitudinal edges of the panel-shaped carrier matrix in order to realize the reinforcement of the bearing axes.

In this context, frictionally connecting advantageously does not necessarily mean producing the connection by means of a positive fit. A positive fit is one option for producing a frictional connection between the carrier matrix reinforcing device and the carrier matrix itself in order to transmit forces. However, it would also be possible to utilize mechanical connections such as, for example, mutual claw connections, plug-type connections, screwed connections, bonded connections or riveted connections for realizing a force transmitting means, i.e., for producing a frictional connection. In this context, frictional connection may even refer to an integral connection of the type produced, for example, by means of a joint manufacturing process as it is the case, for example, with composite materials.

Two things essentially are required in order to ensure that the carrier matrix reinforcing device also has a greater flexural rigidity than the carrier matrix. On the one hand, the material of the carrier matrix reinforcing device needs to be chosen such that a greater resistance is provided due to the material components and the flexural rigidity consequently is increased. With regards to material technology, this is achieved with a corresponding choice of the material with respect to its modulus of elasticity (also referred to as elastic modulus). On the other hand, the alignment of the carrier matrix reinforcing device is chosen such that a relatively high geometrical moment of inertia is realized due to the corresponding cross section of the carrier matrix reinforcing device, i.e., the cross section that is relevant with respect to bending moments extending transverse to the axial directions of the bearing axes. The flexural rigidity is mechanically defined as the product of modulus of elasticity and geometrical moment of inertia and therefore not only refers to the material of the carrier matrix reinforcing device, but also to its cross section with respect to bending moments extending transverse to the axial directions of the bearing axes. Consequently, not only the choice of material for the carrier matrix reinforcing device, but also its alignment, as well as its cross section, plays a decisive role in achieving the inventive increase in flexural rigidity.

It should be emphasized that the carrier matrix reinforcing devices do not necessarily have to be realized with their main extension along the reinforced bearing axes of the longitudinal edges within the scope of the present invention. It would, in principle, also be conceivable that freely arranged carrier matrix reinforcing devices are realized, for example, transverse or even angular to the bearing axes such that a sufficient increase in the flexural rigidity of the partition against bending moments that extends transverse to the axial directions of the bearing axes (geometrical moments of inertia) is still achieved by means of the carrier matrix due to the choice of material (modulus of elasticity) and the active cross section. Depending on the alignment, a harder or softer material therefore needs to be chosen for the carrier matrix reinforcing device. In combination, however, a person skilled in the art may freely choose whether the product of the flexural rigidity is rather based on a high modulus of elasticity or a high geometrical moment of inertia or on both values in average ranges. This increases the freedom of material choice and the constructional flexibility with respect to the carrier matrix reinforcing devices.

In this context, the term "elastic material" for forming the panel-shaped carrier matrix refers to a material that has a relatively low flexural rigidity. The elastic material particularly has a relatively low modulus of elasticity such that the panel-shaped carrier matrix can also be readily deformed under the influence of low forces. This does not represent a problem with respect to the functionality of the inventive partition because the required stabilization is achieved with the carrier matrix reinforcing device. With respect to the panel-shaped carrier matrix, however, the term "elastic material" refers to a material that can build up adequate internal restoring forces such that these restoring forces suffice for generating the movement of the partition between the at least two stable deformation states in correlation with bearing devices, in which the reinforced bearing axes of the oppositely positioned longitudinal edges of the panel-shaped carrier matrix can be supported.

In individual instances, however, it may also be advantageous if the at least one carrier matrix reinforcing device additionally reinforces the carrier matrix in the transverse direction, i.e., in a direction that extends transverse to the axial directions of the bearing axes. In such an instance, corresponding carrier matrix reinforcing devices could also be used for realizing an improved deformation characteristic between the at least two stable deformation states in addition to a stabilization against bending moments that extend transverse to the bearing axes.

In an embodiment, it may be advantageous if the frictional connection between the at least one carrier matrix reinforcing device and the panel-shaped carrier matrix at least sectionally comprises a positive-fit connection. Within the scope of the present invention, the term "positive-fit connection" therefore includes all types of connections that make it possible to transmit forces between the carrier matrix reinforcing device and the panel-shaped carrier matrix without additional contacting means such as screws or adhesives although such means may be optionally provided as part of a positive fit for safety purposes. In fact, a positive fit refers to surfaces being positioned on top of one another and supporting one another such that they serve as force transmitting surfaces. For example, this consequently includes pockets, into which the reinforcing device in the form of, for example, rods can be inserted. It is likewise possible to realize the frictional connection in the form of a positive fit by injection-moulding around the elastic partition. For example, it is possible to completely or at least partially injection-mould around the carrier matrix reinforcing device after it was placed in a corresponding injection mould such that a positive fit between the carrier matrix reinforcing device and the panel-shaped carrier matrix is already realized during the manufacturing process of the elastic partition. It is also possible that the elastic partition comprises a composite material, wherein the carrier matrix reinforcing device and the panel-shaped carrier matrix are connected to one another, for example, by a carrier matrix in the form of a free-flowing resin.

In an embodiment, it may furthermore be advantageous if the frictional connection between the at least one carrier matrix reinforcing device and the panel-shaped carrier matrix at least sectionally comprises a mechanical connection. Consequently, a combination of positive-fit connection and mechanical connection naturally would also be conceivable such that the frictional connection can be achieved by means of a positive fit, as well as by means of a mechanical connection, in the respective sections or even parallel in one and the same section. Two variations are basically conceivable as mechanical connection. On the one hand, it is possible to produce an integral connection between the carrier matrix reinforcing device and the panel-shaped carrier matrix. This can be realized, for example, by means of welding when connecting metallic materials or plastics. A vulcanization process, i.e., an adhesive connection of chemical nature, would also be conceivable. It is furthermore possible to produce the mechanical connection by means of adhesion promoters, i.e., an adhesive connection that increases the adhesive forces between the carrier matrix reinforcing device and the panel-shaped carrier matrix. Particularly in mechanical connections that are not realized in the form of an integral connection, however, it is decisive that the frictional engagement of the mechanical connection also has a corresponding permanent stability under loads. It must be ensured that the frictional engagement of the connection also remains intact over a plurality of load alternations, i.e., over a plurality of movements back and forth between the individual stabile deformation states.

It may furthermore be advantageous if the panel-shaped carrier matrix of an inventive partition features weakening grooves that extend along the bearing axes of the panel-shaped carrier matrix such that the flexural rigidity of the partition is reduced in an extension transverse to the bearing axes of the panel-shaped carrier matrix. In a manner of speaking, these weakening grooves have the opposite effect of the carrier matrix reinforcing device. They reduce the flexural rigidity in one direction against bending moments that extend along the longitudinal axes and therefore make it possible to move the partition more easily between its individual stable deformation states. In other words, the difference between a flexural rigidity against bending moments along the longitudinal axes of the carrier matrix and a flexural rigidity against bending moments transverse to the bearing axes of the carrier matrix is increased. This increase may be realized in the form of a more pronounced reinforcement by means of the carrier matrix reinforcing device or in the form of a more pronounced weakening by means of the weakening grooves. The combination of both functionalities serves for finding an ideal proportion for the respective operating site and the respective operating situation and for distinguishing the respectively required variation of the flexural rigidity in the two directions in accordance with the respective requirements. In this way, the freedom of material choice for the carrier matrix reinforcing device, as well as for the carrier matrix itself, is broadened such that it is also possible to use less expensive materials.

It may furthermore be advantageous if the at least one carrier matrix reinforcing device of an inventive partition can be reversibly deformed between the first and the second deformation state, wherein the two deformation states differ with respect to their curvature along the bearing axes of the panel-shaped carrier matrix. In this respect, it would be possible, in particular, that the different curvatures are realized convex in a first stable deformation state and concave in a second stable deformation state. However, it would also be conceivable that the respective curvatures have the identical value, but opposite signs such that a complete reversal takes place between the two stable deformation states. It would furthermore be conceivable that the partition in this way at least sectionally adjoins an inner wall of a receptacle space in a first stable deformation state and therefore makes available a receptacle space in the form of the entire interior. A more complex separation into partial receptacle spaces of different size can also be realized in this way.

In an embodiment, it is furthermore advantageous if the at least one carrier matrix reinforcing device of an inventive partition comprises a rod with constant cross section. The constant cross section allows a simplified combination and a simplified production of the frictional connection between the carrier matrix reinforcing device and the carrier matrix itself. For example, pockets may be realized in the carrier matrix and the carrier matrix reinforcing devices in the form of rods may be inserted into said pockets due to their constant cross section. In such a design, however, it needs to be ensured that the rods are prevented from sliding out of such pockets. Another advantage of the constant cross section can be seen in that this cross section is responsible for the geometrical moment of inertia and therefore has a decisive influence on the flexural rigidity against bending moments extending transverse to the bearing axes. Consequently, a constant cross section corresponds to a constant geometrical moment of inertia such that rods of this type serve for realizing a constant flexural rigidity over the entire carrier matrix reinforcing device in the relevant direction.

It may also be advantageous if the elastic material of the carrier matrix of an inventive partition is selected from one individual material listed below or a combination of several materials listed below:
  silicone rubber
  ethylene-propylene-diene rubber (EPDM)
  thermoplastic elastomer (TPE)
  plastic
  textile material
  metal foil
  sheet metal
  leather strap with return spring.

When selecting from the preceding list, one should keep in mind that it is not only possible to make an individual selection, i.e., to select one individual material component, but that the combination of individual materials with one another would also be conceivable. During this selection, it is furthermore necessary to keep in mind that the material needs to comply with required temperature fluctuations to be taken into account with respect to the operating area. The complete functionality and the complete elasticity of the carrier matrix, as well as the complete reinforcement of the carrier matrix reinforcing device, needs to be ensured in this temperature range. With respect to the use in motor vehicles, this temperature range usually lies between −35° C. and +85° C. It is furthermore advantageous if the materials used have a high resistance to direct insolation, particularly a UV-resistance. A high resistance to chemicals such as, for example, to leaking contents of beverage containers is also advantageous within the scope of embodiment disclosed herein. When using textile material, it may be advantageous if the textile material is interwoven and the textile material itself already features different materials that combine different flexural rigidities with one another due to the weaving structure. In this way, it is possible to realize an externally uniform material in the form of a textile material that has different flexural rigidities in different directions in accordance with various embodiments disclosed herein.

When using EPDM for the carrier matrix, however, it is advantageous to paint or laminate this carrier matrix in order to ensure the necessary resistances and the thusly required permanent stability with respect to the deformation between the stable deformation states.

The carrier matrix reinforcing device according to the present invention advantageously is at least partially made of polyamide. The manufacture of polyamide not only allows an inexpensive production due to the low material cost, but furthermore also a simple production due to the thermoplastic nature of this material. In the context of the present invention, a material pairing of polyamide with a carrier matrix of silicone or EPDM is particularly advantageous because a very good adhesion predominates between these materials.

It may furthermore be advantageous if the longitudinal edges of the panel-shaped carrier matrix of an inventive partition are adapted to the support in bearing devices in the storage device in such a way that the partition can be supported in the bearing devices in an articulated fashion about the bearing axes formed by the longitudinal edges of the carrier matrix. In this way, the elastic partition is adapted to the insertion into a storage device such that the partition can freely move between these bearing devices and assume the desired deformation states.

According to another embodiment, a storage device for use in the passenger compartment of a vehicle is proposed, with said storage device featuring:
  a bottom surface and an inner wall for forming a receptacle space,
  at least two bearing devices that are realized in the inner wall and serve for accommodating a partition,
  at least one partition according to an inventive embodiment.

The partition is accommodated by the bearing devices of the inner wall with its oppositely positioned lateral edge sections in such a way that the partition can be reversibly deformed between at least two stable deformation states with sectionally opposing curvatures such that the receptacle space is divided into separated partial receptacle spaces in at least one deformation state.

The embodiment proposes, in particular, a storage device for use in the passenger compartment of a vehicle which features a receptacle space that is defined by a bottom surface and an inner wall with at least two bearing devices. Furthermore, at least one inventive partition is provided and supported in an articulated fashion in the bearing devices of the inner wall with its oppositely positioned longitudinal edges, wherein the partition can be reversibly deformed between at least two stable deformation states in such a way that the partition has a first curvature in a first stable deformation state and the partition has a second curvature in a second stable deformation state. The partition extends between the two bearing devices in such a way that it forms separated partial receptacle spaces in the receptacle space. Consequently, an inventive storage device has the same advantages as those already elucidated above with reference to the inventive partition.

An inventive storage device may be enhanced to the effect that at least one overload safety is provided for the elastic partition, wherein this overload safety is realized in such a way that it releases at least one of the bearing edges from the corresponding bearing device starting at a predefined bearing force. Such an overload safety serves for preventing excessive tensions, i.e., tensions in the material of the partition that exceed the stress limit of the material. This applies, in particular, to the stress limit of the material with the least flexural rigidity, i.e., usually the carrier matrix. In this way, not only severe damages to the partition that may lead to its destruction are precluded, but also structural transformations that would reduce the permanent stability of the partition.

It may also be advantageous if the inventive storage device is enhanced in such a way that the overload safety is at least partially formed by at least one correspondingly designed bearing device and one correspondingly designed longitudinal edge of the panel-shaped carrier matrix of the elastic partition. This means that the overload safety may comprise two components in order to fulfill its function. It may fulfill its function due to the interaction between bearing device and longitudinal edge. This makes it possible to realize the overload safety in the form of an interaction between longitudinal edges of the partition and the bearing device itself. Due to their corresponding design as an overload safety, the bearing device, as well as the longitudinal edge, make other components of an overload safety unnecessary such that the complexity and therefore also the costs of an inventive storage device are additionally reduced. In this respect, it suffices to release at least one of the two longitudinal edges such that it is also sufficient to adapt a single longitudinal edge of the partition and a single bearing device of corresponding design. This reduces the complexity of the storage device even further such that the manufacture and costs It may furthermore be advantageous if the at least one bearing device of the storage device features at least one spring element that can be moved against a spring force and corresponds to a catch element of the longitudinal edges of the panel-shaped carrier matrix of the partition in such a way that the catch element is in the engaged state thereof held in the bearing device in an articulated fashion by the spring element and the spring element is moved against the spring force such that the catch element is released when a defined bearing force is exceeded. In other words, the overload safety is realized due to an interaction between the bearing device and the longitudinal edges. This is achieved, in particular, with the two functional elements of the spring element of the bearing device and of the catch element of the longitudinal edges of the carrier matrix. These elements communicate with one another such that it is possible to release the catch element and therefore the longitudinal edge with respect to the spring force. In this context, the direction, in which the spring element and therefore the spring force acts, is irrelevant in a first step. It would be possible to exert spring forces in the axial direction of the bearing axis, as well as to provide spring elements that exert a spring force independently of the bearing axis, for example, transverse to the bearing axis.

In this case, the spring element may have different geometric shapes and be realized, for example, in a spherical or lug-shaped fashion. The catch element of the longitudinal edges of the carrier matrix corresponds to the spring element, particularly to its geometric shape. It may be realized, for example, in the form of a lug or a depression that corresponds to the spring element. If the protruding spring element is designed, for example, in the form of a sphere or a lug, the catch element of the longitudinal edges of the carrier matrix is advantageously realized in the form of a depression with a contour that more or less correlates with the spring element. In this way, the spring element can engage into the catch element such that the spring force holds the spring element in the desired engaged position in the catch element. However, the reversed configuration, i.e., a recessed design of the spring element and a protruding design of the catch element, is also conceivable within the scope of the present invention.

It is also possible that the spring element forms a restraint of sorts for the bearing edge. Peripheral restraints around the circumferential direction of the round cross section of the longitudinal edge may be advantageous, in particular, for longitudinal edges of the carrier matrix that have an essentially round cross section. Some of these peripheral bearing devices may be sectionally equipped with springable regions such that an opening of the bearing device remains, through which not only the longitudinal edge of the partition can be installed, but the longitudinal edge in the form of an overload safety can also be released again. In such an instance, the spring elements in the form of the release projections of such a bearing device are effective for an installation surmounting force, as well as a predefined bearing force of the overload safety, i.e., the overload force.

It is furthermore irrelevant whether the spring force is made available by the spring element itself, i.e., by an integral design of a force-exerting part and the spring element, or a separate spring or springable element is provided.

BRIEF DESCRIPTION OF THE DRAWINGS

The present invention is described in greater detail below with reference to the attached drawings. The terms "left," "right," "top" and "bottom" used in this description refer to an orientation of the figures with normally legible reference symbols. In the drawings:

FIG. 9a shows another embodiment of an overload safety, FIG. 9b shows the overload safety according to FIG. 9a in the released state, FIG. 10a shows another embodiment of an overload safety, FIG. 10b shows the overload safety according to FIG. 10a in the released state, FIG. 20a shows an embodiment of a carrier matrix reinforcing device in a first stable deformation state, FIG. 20b shows an embodiment of a carrier matrix reinforcing device in a second stable deformation state, FIG. 21a shows an embodiment of a partition with a carrier matrix reinforcing device in the state according to FIG. 20a, and FIG. 21b shows an embodiment of a partition with a carrier matrix reinforcing device in the state according to FIG. 20b.

DETAILED DESCRIPTION

Figure 1:
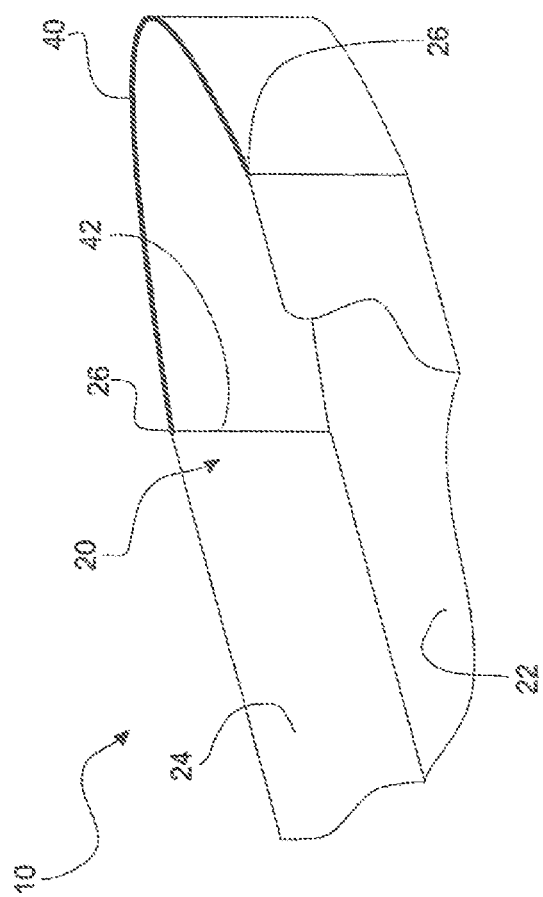
FIG. 1 shows an isometric view of a first embodiment of an inventive storage device.
Figure 2:
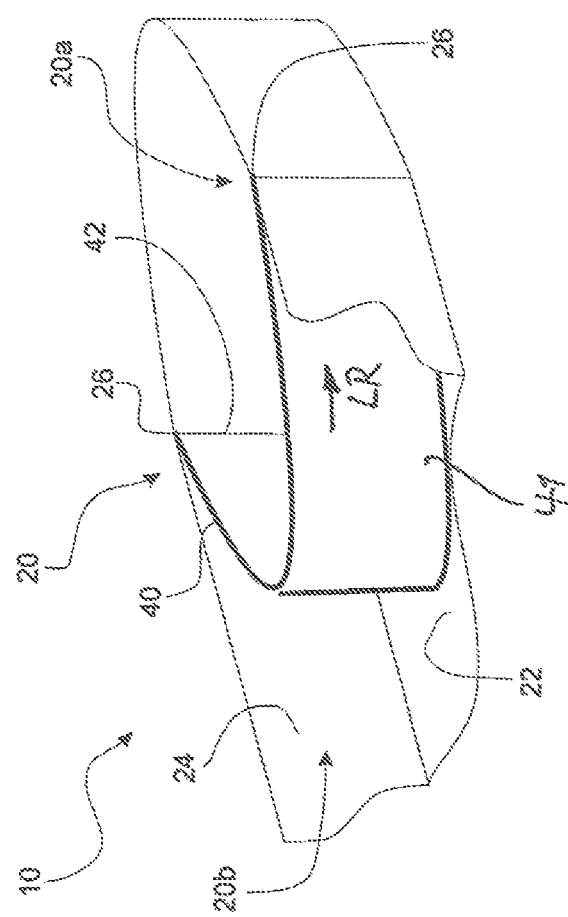
FIG. 2 shows the storage device according to FIG. 1 with a partition in the second stable deformation state.

The basic functionality of an inventive storage device 10 or receptacle device is described below with reference to FIGS. 1 and 2. FIGS. 1 and 2 show a partition 40 that is supported in an articulated or non-articulated fashion in oppositely positioned bearing devices with its lateral edge sections and extends between the lateral edge sections in a longitudinal direction LR, wherein said partition is respectively illustrated in two different stable deformation states in these figures. The first stable deformation state is illustrated in FIG. 1 and the second stable deformation state is illustrated in FIG. 2. The stability of the deformation states results from the overall elasticity of the partition, i.e., in the form of a wall or panel extending between the lateral edge sections that, if the partition has a length L and the partition is supported or held in bearing devices that are spaced apart from one another by a distance that is smaller than the length L, particularly at least 10% smaller than the length L, on the one hand yields in the two directions illustrated in FIGS. 1 and 2 and therefore cannot assume the shape of a plane panel, but rather only curved deformation states. The overall panel has an elasticity, at which these deformation states are stable. In these deformation states, in particular, curvature profiles that have no inflection point, i.e., no change of curvature, and therefore represent uniform curvature profiles are respectively formed in the longitudinal direction LR of the partition.

The storage device 10 features a receptacle space 20 or storage space that is defined by a bottom surface 22 and an inner wall 24 with at least one lateral receptacle space surface. The bottom surface 22, as well as the inner wall 24, is illustrated in a cut-out fashion in this case in order to provide a better view of the partition 40. The partition 40 extends through the receptacle space 20 between two bearing devices or receptacle devices 26a, 26b that are arranged on or realized in the inner wall 24. In the embodiment shown, the receptacle devices 26a, 26b are positioned on two sections of the inner wall 26 that face one another and generally extend angular to one another. The partition 40 as a whole is realized elastically such that the partition self-stabilizes the deformation states illustrated in FIGS. 1 and 2 and features two oppositely positioned lateral edge sections 42a, 42b realized in the form of reinforced bearing axes A such that the partition 40 can assume at least two stable deformation states with at least sectionally opposing curvature profiles when the lateral edge sections 42a, 42b are inserted into bearing devices 26a, 26b of the inner wall 24 of a storage device 10 in order to divide a receptacle space 20 of the storage device 10. The lateral edge sections 42a, 42b are also generally identified by the reference symbol 26 in the figures.

Due to the design in a first stable deformation state, the illustrated embodiment of the partition 40 essentially abuts on the inner wall 24 with its entire surface in the illustrated embodiment of the inner wall 24 of the storage device. Due to the abutment over the entire surface, the partition 24 in other words is in the first stable deformation state in a position, in which nearly the entire receptacle space 20 is available for accommodating utensils. However, the partition 40 and the inner wall 24 of the storage device may generally also be designed such that the partition 40 is spaced apart from the inner wall 26 in both deformation states.

The bearing devices that are also generally identified by the reference symbol 26 below extend from the bottom surface 22 and along the inner wall 24 up to its upper end. If the partition 40 is now moved out of the first position illustrated in FIG. 1, i.e., out of the first stable deformation state, it is moved through a plurality of intermediate positions that respectively are unstable deformation states of the partition 40 due to its elasticity. These unstable deformation states originate from clamping forces in the bearing devices 26 on the inner wall 24, as well as from elastic restoring forces generated in the material of the partition 40. Depending on the position of the elastic partition 40, this partition 40 therefore seeks to assume one or the other stable deformation state from the unstable deformation states. As soon as the movement of the partition 40 from the position illustrated in FIG. 1 exceeds a minimum position between the two bearing devices 26, the partition 40 seeks to assume the second stable deformation state, i.e., the position illustrated in FIG. 2. FIG. 2 shows the final state of this movement, i.e., the partition 40 in the second stable deformation state. In this position, the partition 40 divides the receptacle space 20 into two partial receptacle spaces 20a and 20b. In this case, the partial receptacle space 20a is positioned between the partition 40 and the part of the inner wall 24, on which the partition 40 abuts in the first stable deformation state as illustrated in FIG. 1. In this position, small utensils, as well as beverage containers, can be accommodated in the partial receptacle space 20a between the partition 40 and the corresponding inner wall 24. The overall elasticity of the partition therefore is realized in such a way that the partition as a whole has a sufficient inherent stability in the two stable deformation states.

At least one overload safety device may be provided in the storage device 10 in order to prevent damages to or even the complete destruction of the partition 40. The overload safeties 50 are realized, in particular, in connection with the bearing devices 26 and the longitudinal edges 42 of the partition 40. This type of overload safeties 50 according to the present invention is described in greater detail further below.

Figure 3:
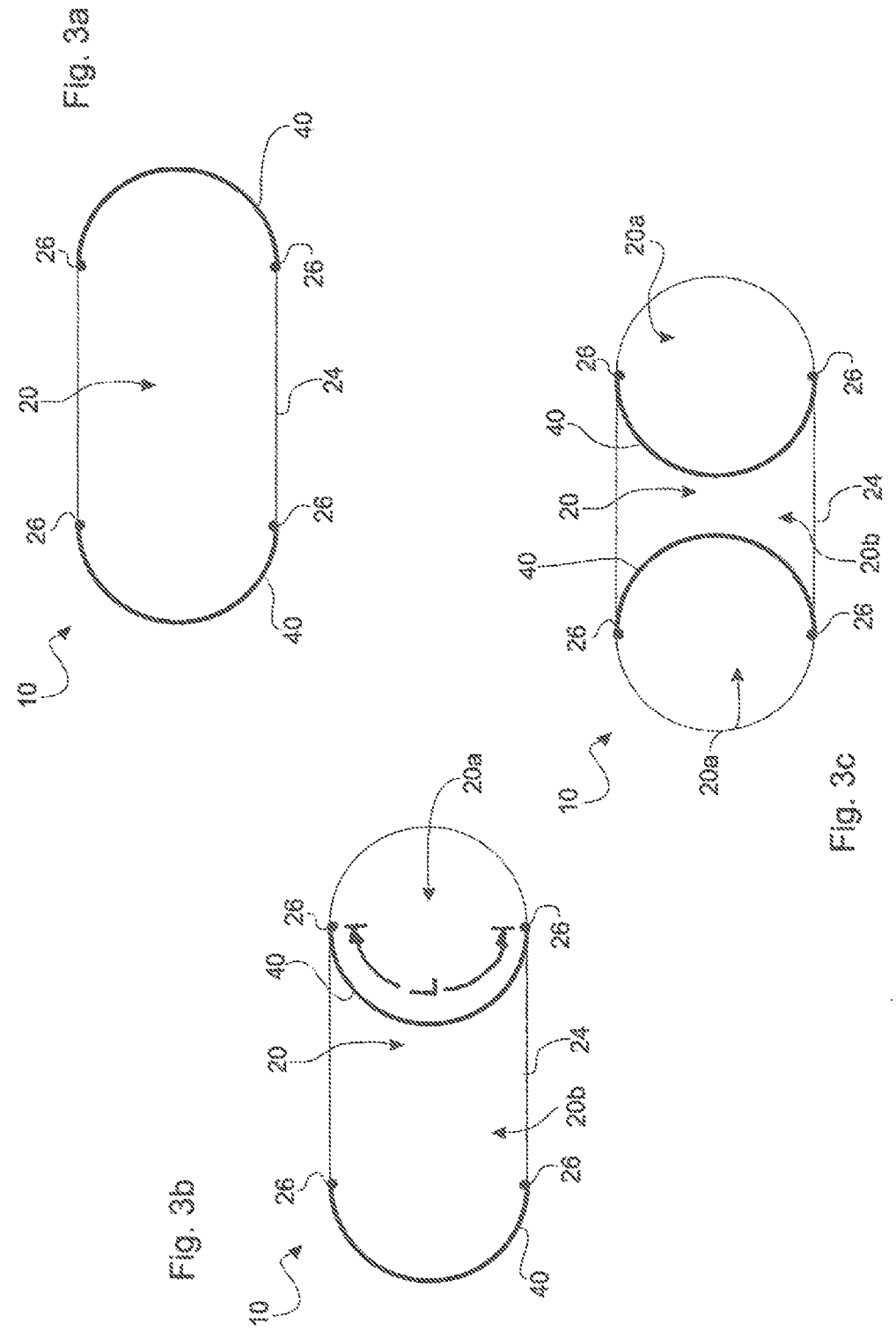
FIG. 3a shows another embodiment of a storage device with two partitions.
FIG. 3b shows the storage device according to FIG. 3a with a partition in a different stable deformation state.
FIG. 3c shows the storage device according to FIGS. 3a and 3b with both partitions in different deformation states.

FIGS. 3a to 3c show another embodiment, wherein the storage device 10 features a receptacle space 20, in which two partitions 40 are arranged. This further elucidates the flexibility of use of an inventive storage device 10. For example, it is possible to divide a single large receptacle space 20 of the type illustrated in FIG. 3a into two partial receptacle spaces 20a and 20b as illustrated in FIG. 3b, as well as into three partial receptacle spaces 20a, 20b as illustrated in FIG. 3c. Partial receptacle spaces 20a according to FIG. 3a may also have an identical, i.e. symmetrical, arrangement and geometric design. The extension of the partitions 40 from a retracted first deformation state that is illustrated for both partitions 40 in FIG. 3a into the extended second deformation state that is illustrated for both partitions 40 in FIG. 3c therefore creates a flexibility of use for the user who can freely choose between one large receptacle space 20 according to FIG. 3a, one medium-sized receptacle space 20b and one small receptacle space 20a as illustrated in FIG. 3b or three small receptacle spaces 20a and 20b as illustrated in FIG. 3c.

Figure 4:
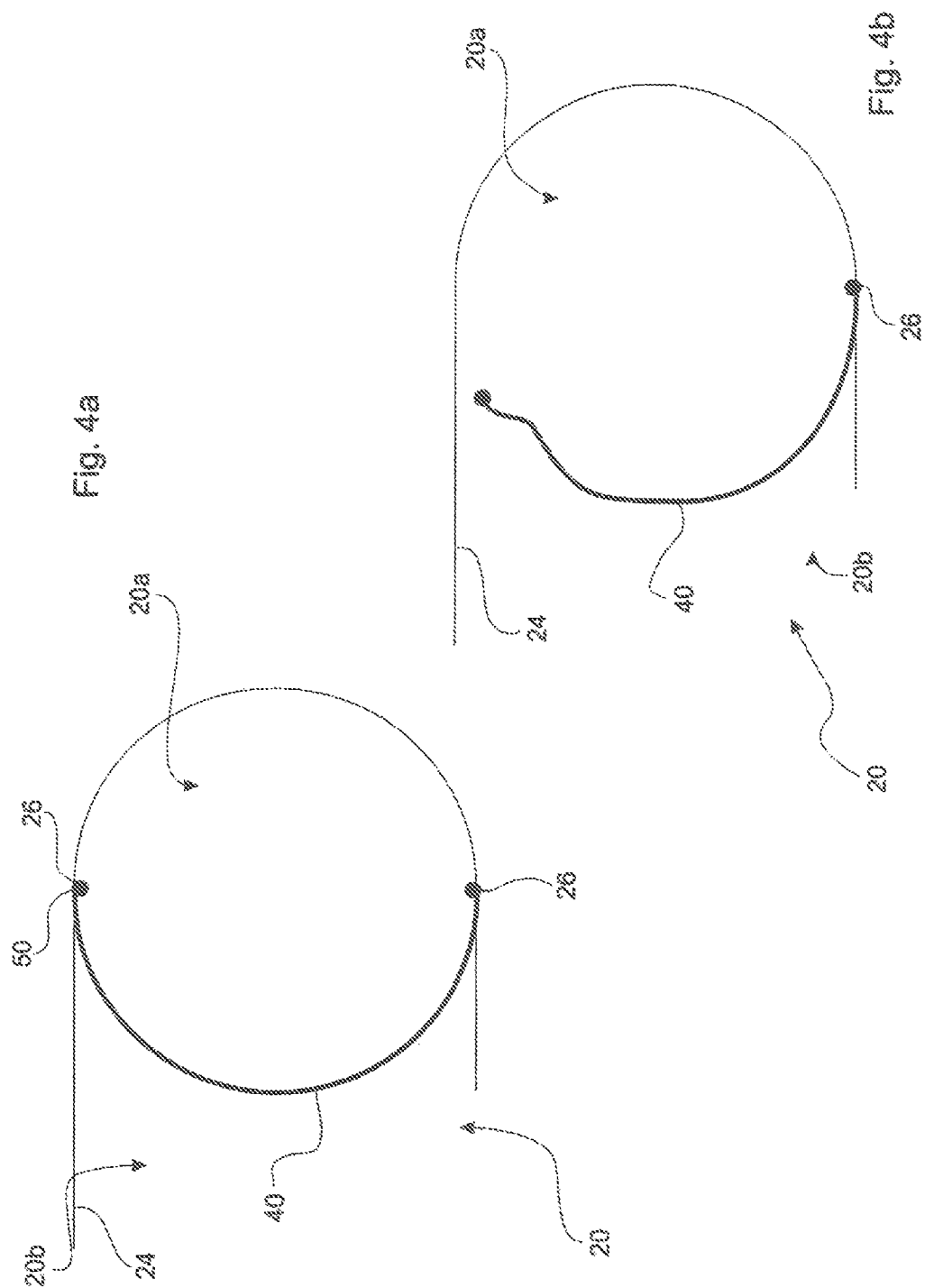
FIG. 4a shows a detail of the storage device according to FIGS. 3a to 3c.
FIG. 4b shows the detail according to FIG. 4a with a partition with released longitudinal edge.

Since the user of an inventive storage device 10 usually will frequently change between the individual configurations and these changes are associated with a relatively high stress on the partition 40 and the bearing devices 26, it is possible, according to the present invention, to provide at least one overload safety 50, the function of which is briefly described below with reference to FIGS. 4a and 4b.

FIG. 4a shows an enlarged detail of the embodiment according to FIGS. 3a to 3c. The partition 40 is illustrated in the second stable deformation state, i.e., in the extended state, in FIG. 4a. In this case, the partition 40 extends between the inner wall 24 between the two bearing devices 26 that essentially are oppositely positioned. On the upper side of the illustration in FIG. 4a, an overload safety 50 is partially realized integrally with the bearing device 26 as elucidated in greater detail below with reference to the following embodiments. If the partition 40 is now moved into the position illustrated in FIG. 4a, the partition 40 stops in the second deformation state at the end of this movement in accordance with the state illustrated in FIG. 4a. The stop, i.e., the deceleration of the movement of the partition 40, is absorbed by forces in the material of the partition 40 that in turn are supported in the bearing devices 26. If these forces exceed the material stability of the partition 40, changes to the material, particularly the material structure, can occur such that the material is weakened and the permanent stability under loads of the partition 40 is reduced many times over. It is also conceivable that not only a structural change occurs starting at a certain force, but also ripping or complete tearing of the partition 40 such that the partition is rendered unusable together with the entire storage device 10.

This is prevented by providing the overload safety device 50 that intervenes in order to create a situation of the type illustrated in FIG. 4b. In this case, the longitudinal edge 42 that is not illustrated in greater detail in FIG. 4b is released from the overload safety 50 and therefore also from the bearing device 26 such that the stresses in the partition 40 can be relieved and no stress concentrations or force peaks can lead to structural changes in the material or to tears and damages or the destruction of the partition 40. The overload safety 50 therefore protects the functionality of the material of the partition 40 such that the partition also remains functional and can be reinserted into the respective bearing device if excessively high stresses occur.

Figure 5:
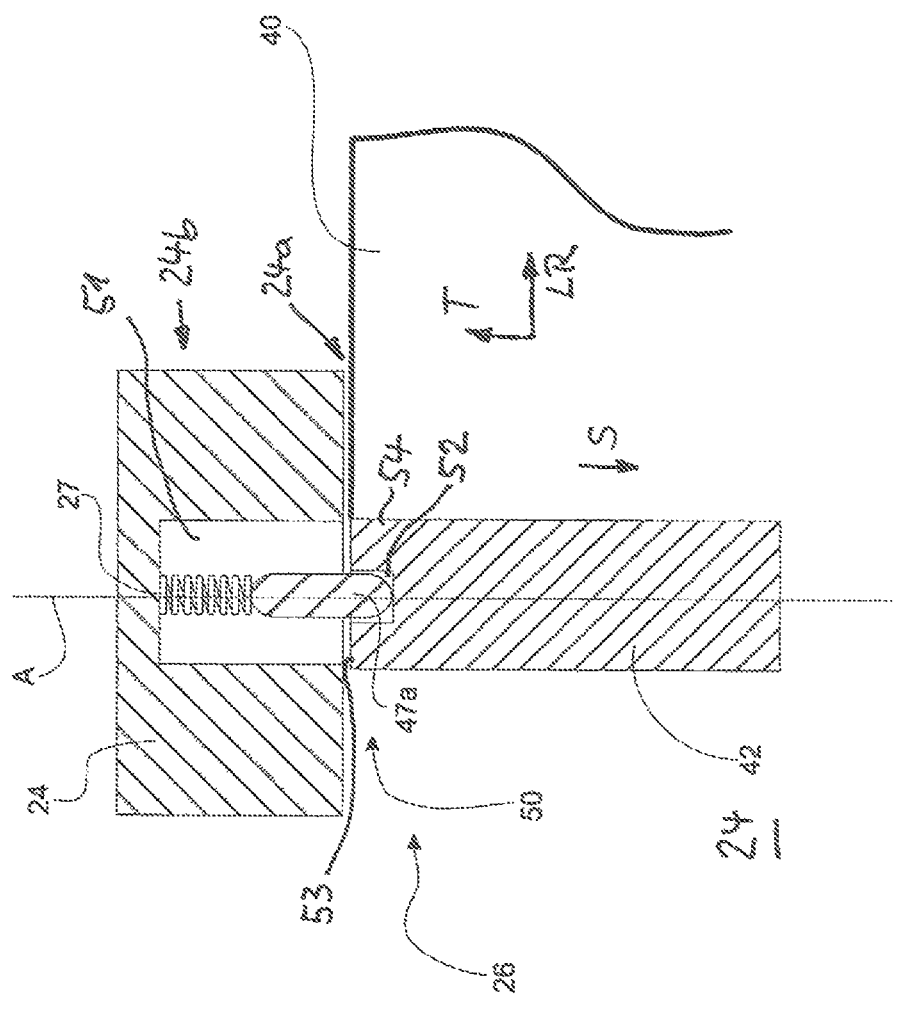
FIG. 5 shows an embodiment of an overload safety.
Figure 6:
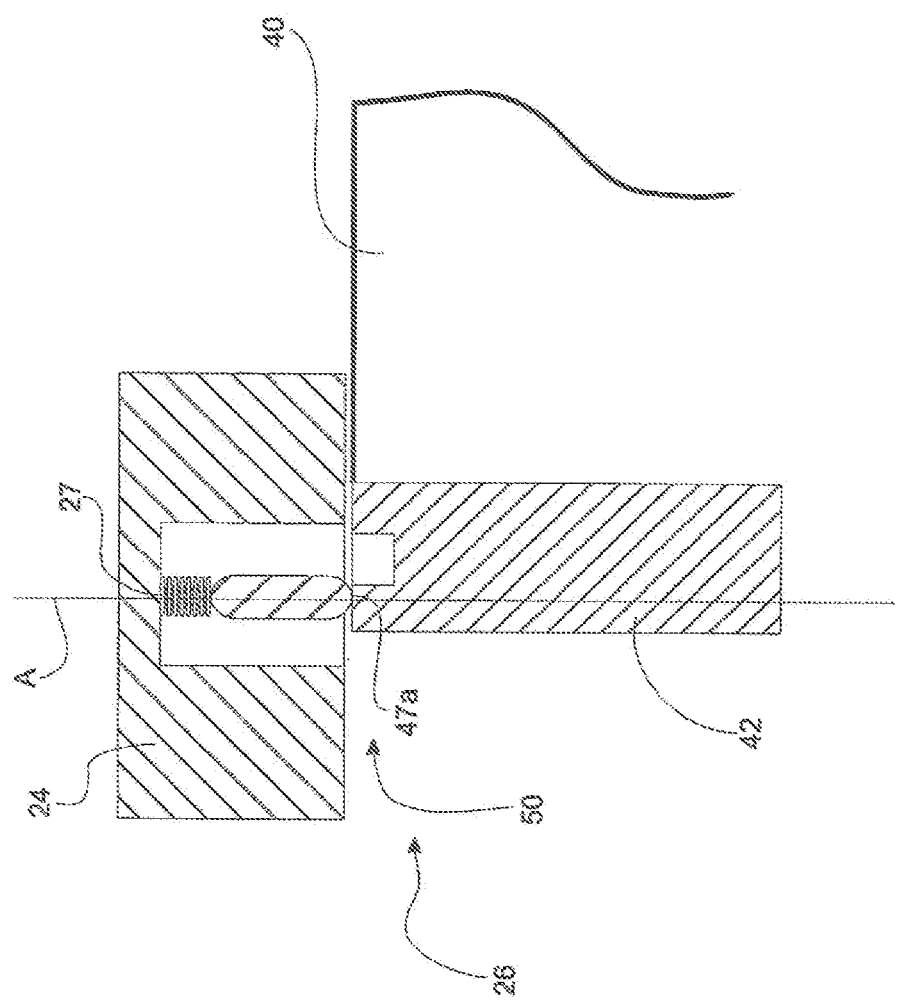
FIG. 6 shows the overload safety according to FIG. 5 in the released state.

FIGS. 5 and 6 show a first embodiment of an overload safety 50 according to the present invention. The overload safety 50 may be provided, in particular, in the inner wall 24. Each of the bearing devices 26 is realized in such a way that a side wall section 42 is respectively supported or held relative to the inner wall 26 in an articulated or non-articulated fashion. In the embodiment according to FIG. 5, the overload safety simultaneously serves for supporting the respective edge section 42.

One embodiment of the overload safety 50 features a catch element 47a that can be moved between a catch position and a release position by means of a prestressing device and is prestressed into the catch position in such a way that the catch element can in its catch position be at least partially inserted into a recess 52 or depression of the partition 40 that is realized on the upper side 53 of the end section 54 that is directed outward in the axial direction A of the lateral edge section 42 of the partition 40 from the inner region thereof and faces the recess 51 in the inserted state of the partition 40. In order to insert the partition, the inner wall may, as illustrated in FIG. 5, be provided with a depression 24a that can accommodate a lateral edge section 42 realized in the form of a reinforced bearing axis and features an in its installed state upper bearing section 24b referred to the direction of the gravitational force and the storage device, wherein said bearing section protrudes over the depression 24a in the horizontal direction and therefore is provided as abutment for the upper side 53. The bottom section of the storage device features a bearing section 24b that lies opposite of the bearing section 24b referred to the direction of the gravitational force such that the lateral edge section 42 can be supported and held between the sections 24b and 24c.

According to one embodiment, the prestressing device may feature at least one spring element 27 that is inserted into the receptacle device and optionally a catch element 47a that is guided and can be moved in the recess 51, wherein said catch element can be moved between a catch position and a release position against the spring force of the spring element 27 and is prestressed into the catch position in such a way that the catch element can in its catch position be at least partially inserted into a receptacle 52 in a lateral edge section 42 of the partition 40 and supports the lateral edge section 42 in an articulated fashion in the engaged state of the catch element 47a, and wherein said catch element can release the lateral edge section 42 from the respective section of the inner wall when a defined value of a transverse force that acts upon the lateral edge section in a direction extending transverse to the direction S of the gravitational force or the axial direction A is exceeded. The prestressing device may also be realized without a catch element 47a.

In the embodiment according to FIG. 5, the prestressing device features a spring element 27 that comprises two parts. On the one hand, the spring element 27 is provided with a coil spring, the axis of which defines the direction of the spring force and is aligned along the bearing axis A of the bearing device 26. On the other hand, the spring element 27 features a pin or a lug-shaped projection that can engage into the depression 52 in the lateral edge section 42 of the partition 40 as a first catch element 47a. FIGS. 5 and 6 also show that the partition 40 features a variation of the longitudinal edge 42 that is realized separately of the main extension of the partition 40. The cross section of the longitudinal edge 42 illustrated in the sectional representations according to FIGS. 5 and 6 is advantageously realized in the form of a round cross section.

FIG. 5 shows the secured state of the overload safety 50 of the partition 10. This means that the spring element 27 is inserted into the depression of the first catch element 47a of the longitudinal edge 42 of the partition 40. This prevents a movement of the partition 40, particularly of the longitudinal edge 42, transverse to the bearing axes A and also prevents a release of the longitudinal edge 42. The spring element 27 simultaneously serves for forming the bearing device 26. For example, the lug-shaped extension of the spring element 27 which protrudes into the depression of the first catch element 47a serves for axially supporting the longitudinal edge 42 along the bearing axis A. In this case, the bearing axis A and the axis of the spring force of the spring element 27 advantageously extend coaxial to one another. In other words, the securing force of the spring element 27 simultaneously exerts the required bearing force of the bearing element 26 upon the longitudinal edge 42 such that the bearing element 26 and the overload safety 50 are essentially realized integrally with one another.

FIG. 6 shows the embodiment according to FIG. 5, however, in the released state. The function of such an overload safety 50 is described below with reference to this situation. If the force that pulls on the longitudinal edge 42 in the partition 40, i.e., the force that tends to pull the longitudinal edge 42 out of the bearing device 26, is so high that it exceeds a predefined value of a bearing force, the spring element 27, particularly its lug-shaped extension, slides out of the depression of the first catch element 47a of the longitudinal edge 42 along its rounded edges. This releases the longitudinal edge 42 such that it can move away from the bearing axis A as illustrated in the situation in FIG. 6. The bearing edge 42 and therefore the entire partition 40 consequently are released from the bearing device 26 such that potential stresses can no longer be supported in the bearing device 26 and the partition 40 moves in the direction of a new equilibrium of forces, in which the values, in particular, of material tensions, i.e., forces in the material of the partition 40, are virtually zero. A structural change in the material of the partition 40, as well as the formation of tears or the destruction of the partition 40 or the longitudinal edge 42, is avoided by thusly preventing an overload by means of the overload safety 50.

The preceding description makes it clear that the function of the overload safety 50 is particularly simple in this embodiment because the predefined bearing force can be adjusted by means of the spring force. Regardless of constructive changes to individual components, different predefined bearing forces that define the release force of the overload safety 50 can be adjusted in dependence on the degree of hardness of the spring. Consequently, it is possible to utilize one and the same constructive device for various materials and geometries of receptacle devices 10 or partitions 40, respectively. In this way, the flexibility of use of such partitions 40 or such receptacle devices 10 is increased many times over.

Figure 7:
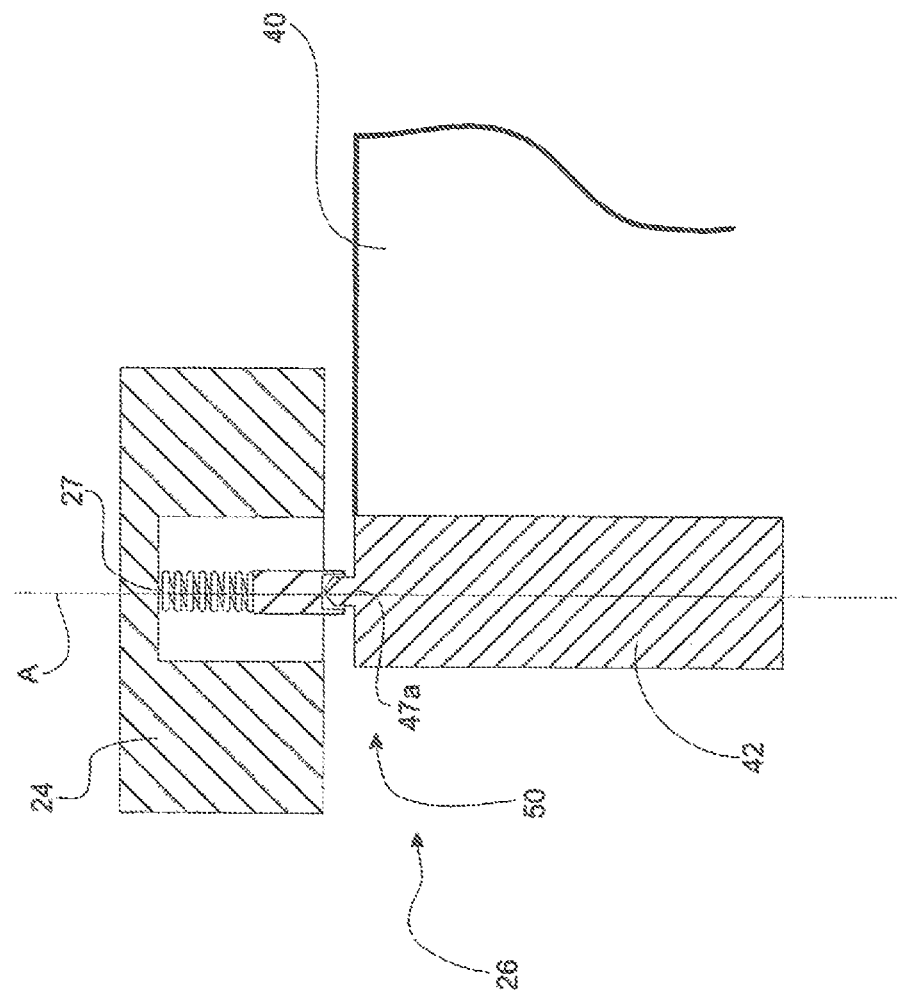
FIG. 7 shows another embodiment of an overload safety.
Figure 8:
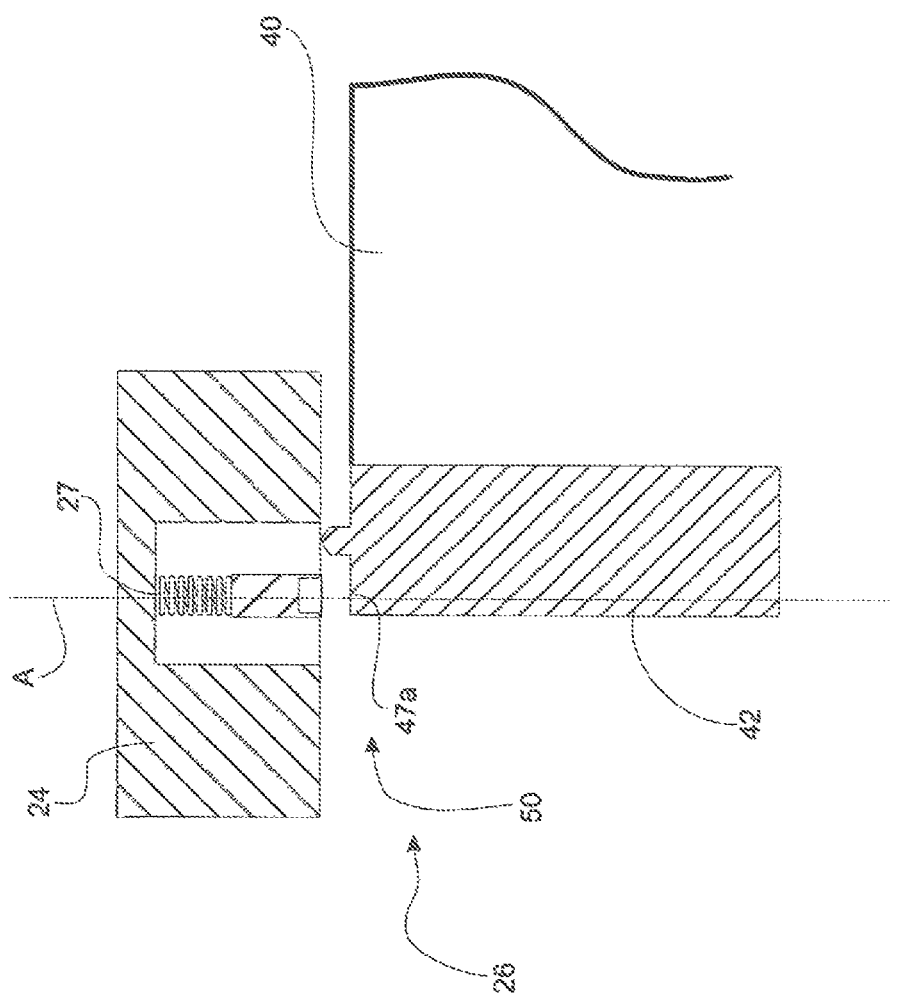
FIG. 8 shows the overload safety according to FIG. 7 in the released state.

FIGS. 7 and 8 are essentially identical to FIGS. 5 and 6, but the functions of the spring element 27 and of the first catch element 47a are reversed in the embodiment illustrated in these two figures. With respect to the spring element 27, this concerns a correlation between a coil spring that is arranged in the inner wall 24 and an extension with a depression. The first catch element 47a in the form of a lug is accommodated in this depression, wherein rounded edges of the extension of the first catch element 47a in this case also ensure that the spring element 27 can be more easily disengaged or pushed back along the bearing axis A against the spring force. The function of the overload safety 50 and the release of the longitudinal axis 42 are identical to the preceding description with reference to FIGS. 5 and 6.

FIGS. 9a and 9b show another embodiment of an inventive overload safety 50. In this case, FIG. 9a also shows the secured position and FIG. 9b shows the release position of the longitudinal edge 42.

FIG. 9a shows the secured position of the overload safety 50. In this case, the overload safety is realized by means of a spring element 47 that comprises a corresponding coil spring and a spherical element. The spherical element protrudes into a depression of a first catch element 47a on the upper end of the longitudinal edge 42 of the partition 40 and therefore secures the partition. In order to form an abutment for the spring force of the spring element 27, a second catch element 47b that is also realized in the form of a depression is provided on the longitudinal edge 42 on the underside of the bearing device 26. This depression corresponds to a lug-shaped extension of the material of the inner wall 24. After the insertion into the position according to FIG. 9a, the spring force of the spring element 27 in a manner of speaking presses the sphere into the depression of the first catch element 47a, wherein the spring element extends along the bearing axis A up to the lower end and therefore up to the depression of the second catch element 47b on the lower end of the longitudinal edge and is supported on the lug-shaped extension of the inner wall 24. Consequently, the lug-shaped extension on the inner wall 24 forms an abutment for the spring force or for the bearing force, respectively. The release function is essentially identical to those described above with reference to FIGS. 5 to 8, but the bearing edge 42 is tilted in this case due to the design of the abutment in the form of a second catch element 47b. It is therefore not necessary to provide the overload safety 50 on the upper and on the lower end, but it rather suffices to arrange a single overload safety 50 on one end of the longitudinal edge 42. Due to the release on one end of the longitudinal edge 42 in accordance with the illustration in FIG. 9b, the partition 40, particularly the longitudinal edge 42, is able to tilt and the longitudinal edge 42 can upwardly separate from the lug-shaped extension of the inner wall 24. In this way, the entire longitudinal edge 42 is released and the number of components and therefore the complexity of the overload safety 50, as well as of the bearing device 26 realized integrally therewith, are simultaneously reduced to a minimum.

FIGS. 10a and 10b show another embodiment of an inventive storage device 10, wherein the function of the overload safety 50 is essentially identical to the function of the overload safety 50 according to the embodiments in FIGS. 5 to 9b. However, the respective bearing force or overload force is redirected in this case. This makes it possible to realize the spring element 27 in the form of a spiral spring. The spiral spring is supported in a receptacle that is arranged in the inner wall 24 to the left of the longitudinal edge 42 of the partition 40. Due to a bend of 180°, a lug in the form of a catch extension extends into the region of the inner wall 24 provided for the bearing device 26. A lug-shaped extension on the spring element 27 engages into a depression of a first catch element 47a on the upper end of the longitudinal edge 42 of the partition 40. A catch extension of the inner wall 24 is provided on the lower end of the longitudinal edge 42 analogous to FIGS. 9a and 9b and engages into a depression of the catch element 47b of the longitudinal edge 42 of the partition 40. The release takes place in the same fashion as described above with reference to FIG. 9a and 9b. The advantage of such an embodiment is the redirection of the spring force that respectively serves as bearing force or overload force of the bearing device 26 or the overload safety 50. In comparison with FIGS. 9a and 9b, no structural height is required above the longitudinal edge 42. In fact, the entire spring force of the overload safety is supported to the left of the longitudinal edge 42 of the partition 40 due to the redirection. The entire system of the storage device 10 therefore can be realized in a much more compact fashion, wherein the partition 40 and its longitudinal edge 42 can, in particular, extend much further upward such that the difference in height between the inner wall 24 and the partition 40 is reduced to a minimum.

Figure 11:
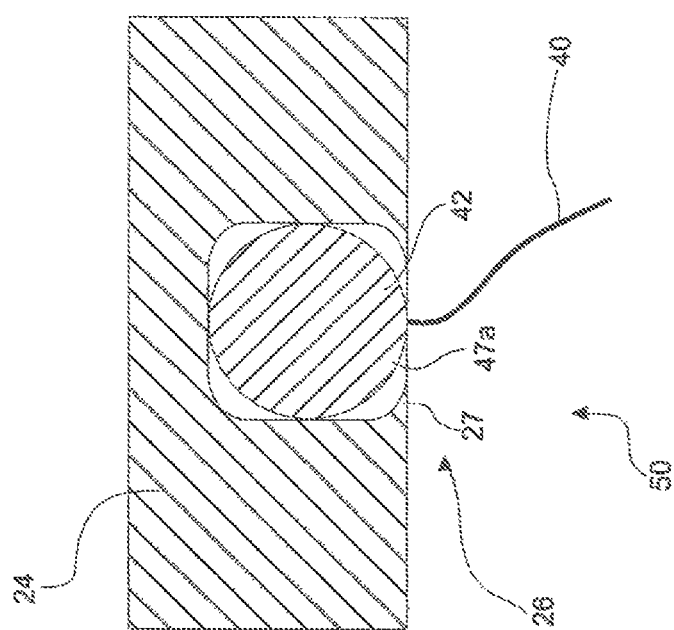
FIG. 11 shows another embodiment of an overload safety.

FIG. 11 shows another embodiment of an inventive overload safety. This figure shows a cross section that essentially extends along the bearing axis A of the bearing device 26. The bearing device 26 is realized integrally with the inner wall 24 in this case. It essentially comprises a bore with an essentially rectangular cross section and rounded corners. The longitudinal edge 42 of the partition 40 is accommodated in this bore and extends along the not-shown bearing axis A extending perpendicular to the plane of projection in FIG. 11. In this case, a section of the inner wall 24 that extends in the direction of the partition 40, i.e., downward in FIG. 11, becomes thinner and thinner such that a spring element 27 is formed due to the reduction of the material thickness. The spring effect of the spring element 20 is defined by the material characteristic, i.e., the restoring force of the material of the inner wall 24, on the one hand and by the dependence on the corresponding material thickness on the other hand. This makes it possible to adjust a spring force that suffices for holding the longitudinal edge 42 of the partition 40 in the required position as long as the partition 40 is operated normally. The force used for the retention in the bearing device 26 simultaneously also serves as a spring element 27 of an overload safety 50. Consequently, parts of the longitudinal edge 42 act along its circumferential direction and abut on the spring element 27 in the form of first catch element 47a. These catch elements bend the spring elements 27 outward such that the longitudinal edge 42 can be completely released. An embodiment of the type illustrated in FIG. 11 may in this case be realized over the entire axial extension of the longitudinal edge 42 along the bearing axis A or only sectionally.

Figure 12:
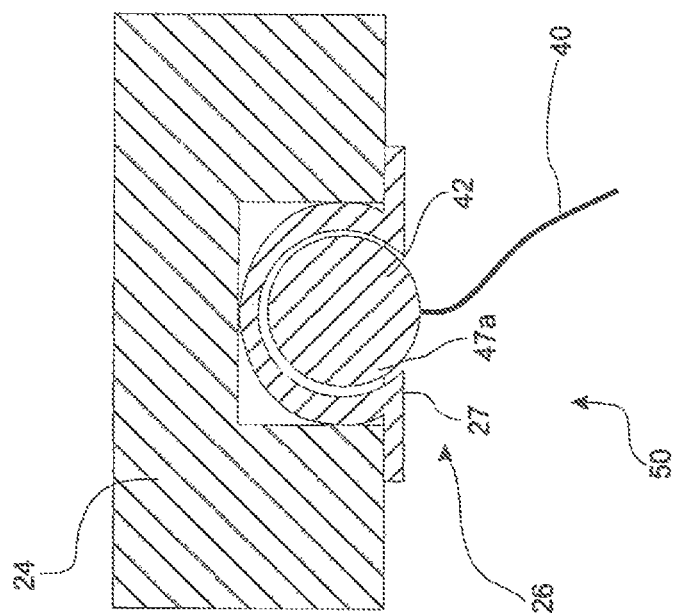
FIG. 12 shows another embodiment of an overload safety.

FIG. 12 shows another embodiment of an inventive overload safety that is realized similar to the overload safety described above with reference to FIG. 11. In contrast to FIG. 11, however, the spring element 26 is not realized with the material of the inner wall 24 in this embodiment, but a clip is provided that essentially has a cross section in the shape of the Greek letter omega. In this case, the edges of the clip of the overload safety 50 that are directed toward the opening of the omega-shaped clip act as spring elements 27 and the corresponding contact sections of the longitudinal edge 42 of the partition 40 act as corresponding first catch element 47a. The omega-shaped overload safety component, i.e., the spring elements 27, is also bent open in this case such that the longitudinal edge 42 of the partition 40 can be completely released.

Different embodiments of optional functionalities of the present invention such as, for example, the overload safety 50 were described above with reference to FIGS. 1 to 11. The core of the invention, namely the stabilization of the carrier matrix 80 by means of carrier matrix reinforcing devices 60, is described in greater detail below with reference to the following figures.

Figure 13:
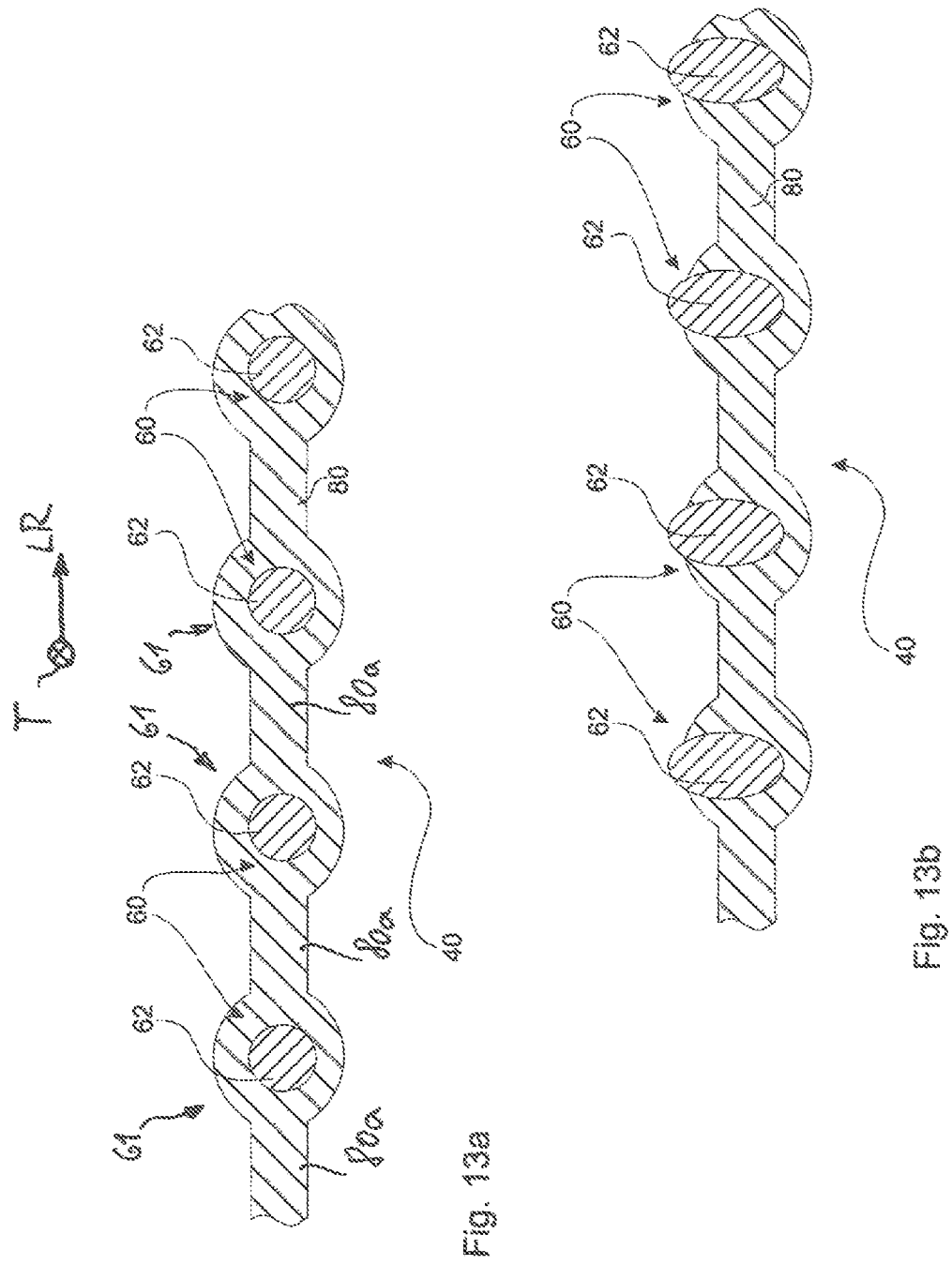
FIG. 13a shows another embodiment of an inventive partition.
FIG. 13b shows another embodiment of an inventive partition.

FIGS. 13a and 13b show two embodiments of an inventive partition 40. They serve as reinforcement against torsional moments, i.e., bending moments, the vector of which is aligned along the longitudinal direction L of the partition 40 or essentially perpendicular to the longitudinal edge 42 or the bearing axis A, respectively.

This is achieved with rods 62 of carrier matrix reinforcing devices 60 that essentially extend along the bearing axis A that is not illustrated in FIGS. 13a and 13b within a carrier matrix 80 of the partition 40. The carrier matrix 80 of the partition 40 comprises an elastic material that, with respect to its material components and with respect to the required flexural rigidity, can be much easier adapted to the required restoring forces and restoring moments about a moment axis extending along the depth direction T in order to be deformed into the two stable deformation states. The depth direction T made by definition be the axial direction A that is defined by the shape of the lateral edge section 42 and the bearing devices. The deformation states of the partition 40 are purposefully stabilized against undesirable torsions or flexures by means of the carrier matrix reinforcing devices 60. In this case, it would be possible to completely injection-mould around the carrier matrix reinforcing devices 60, particularly the rods 62, such that they are completely accommodated in the interior of the partition 40 as illustrated in FIG. 13a. This may be advantageous with respect to the utilization of less expensive materials such as, for example, non-stainless steels for the rods 62 because corrosion is prevented due to the lack of contact with the environment.

It would generally be possible, in particular, that the partition 40 features at least one flexurally rigid carrier matrix reinforcing device 60 that is realized in the form of longitudinal profiles 61 on or through the carrier matrix 80 which extend transverse to the longitudinal direction L of the partition 40. The longitudinal profiles extend in the depth direction of the partition 40. Viewed in the longitudinal direction L, connecting regions 80a of the carrier matrix 80 are positioned between adjacent longitudinal profiles 61 and connect the longitudinal profiles to one another and/or jointly form a base plate of the partition 40 that extends between and connects the lateral edge sections 42a, 42b. The longitudinal profiles increase the flexural rigidity of the partition 40 against bending moments, the moment axis of which extends transverse to the axial directions of the bearing axes A, in comparison with the flexural rigidity of the carrier matrix 80 without longitudinal profiles. In order to realize an elasticity of the partition, at which a deformation thereof generates restoring moments suitable for the stabilization of the stable deformation states about a moment axis extending in the depth direction T of the partition 40, the connecting regions 80a comprises a suitable material with adequate elasticity and are realized, in particular, with a suitable thickness. The restorability of the partition and the stabilization of the stable deformation states in the inserted state thereof may result, in particular, from the elasticity of the connecting regions only because the longitudinal reinforcing profiles are unable or only barely able to curve about a curvature axis extending in the depth direction.

The embodiment according to FIG. 13b essentially is very similar to the embodiment according to FIG. 13a, but the rods 62 have an essentially elliptical cross section in this case. These elliptical cross sections additionally reinforce the partition 40 along the transverse direction, i.e., essentially perpendicular to the bearing axis A. In this way, the extensibility and therefore the destabilization of the stable deformation states are additionally reduced. Furthermore, the rods 62 protrude from the interior of the carrier matrix 80 of the partition 40 such that materials of higher quality are required in this case. However, this protrusion creates an optical structure of technical nature and makes it possible to achieve an overall appearance of an inventive receptacle device 10, particularly an inventive partition 40, that is perceived as highly aesthetic by the user.

Figure 14:
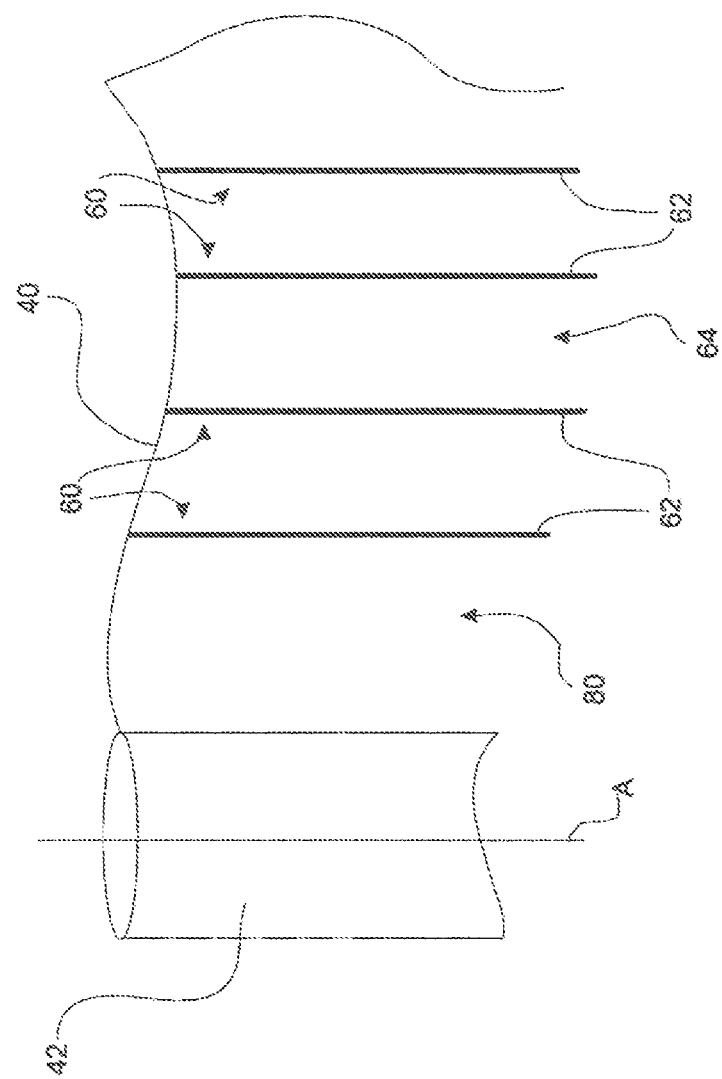
FIG. 14 shows another embodiment of an inventive partition in the form of an isometric view.

FIG. 14 shows a schematic isometric view of an embodiment of an inventive partition 40. According to this figure, the rods 62 of the carrier matrix reinforcing devices 60 are essentially aligned along the longitudinal axis that is realized in the form of the bearing axis A of the longitudinal edges 42 of the partition 40. The carrier matrix 80 connects the two longitudinal edges 42, of which only the left edge is illustrated in this figure.

Figure 15:
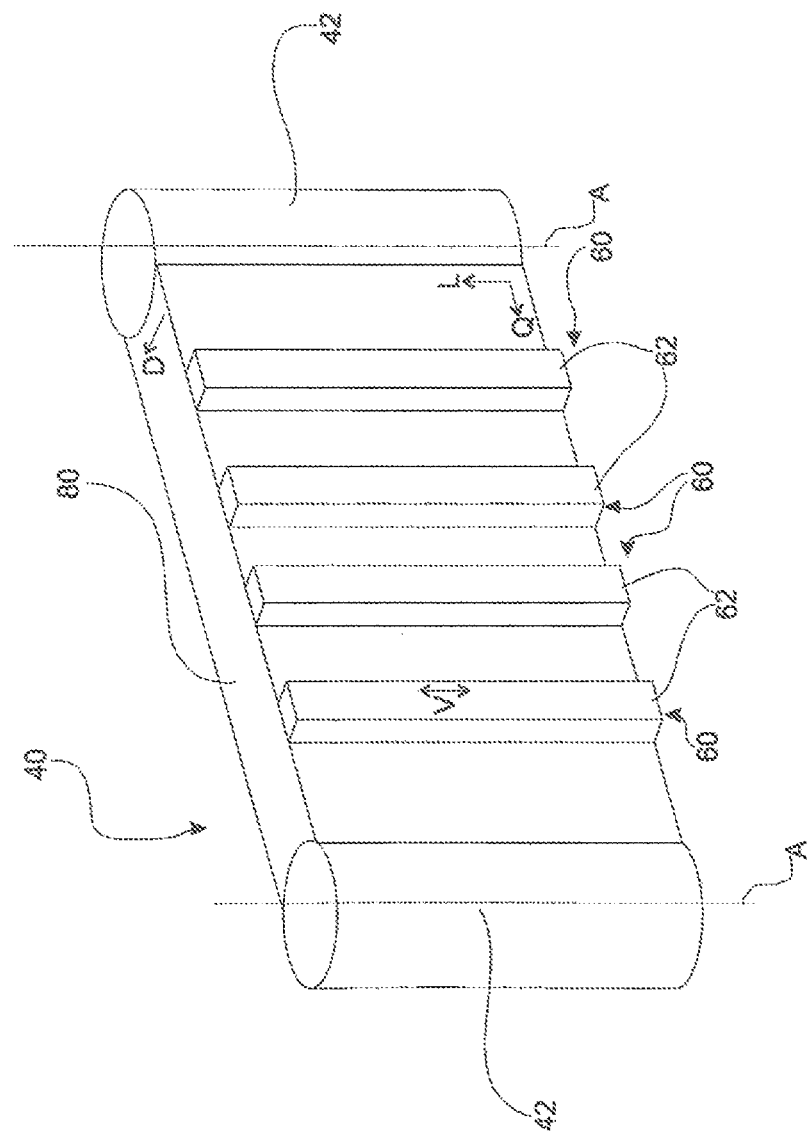
FIG. 15 shows another embodiment of an inventive partition in the form of an isometric view.

FIG. 15 shows a first embodiment of an inventive partition, wherein the carrier matrix reinforcing devices 60 are realized in the form of rods 62 in this embodiment. The functional connection between the carrier matrix reinforcing devices 60 and the carrier matrix 80 is produced by means of an adhesive connection at this point. In this case, the carrier matrix reinforcing devices 60 essentially extend along the longitudinal extension L of the carrier matrix 80 and therefore along the bearing axes A formed by the longitudinal edges 42. In this case, the reinforcing direction that is of primary importance within the scope of the present invention, i.e., the reinforcing direction along the bearing axes A of the longitudinal edges 42 of the partition 40 against bending moments that extend transverse to the bearing axes of the longitudinal edges 42 of the partition 40, is indicated as reinforcing direction V. In the embodiment according to FIG. 15, the carrier matrix reinforcing devices 60 are arranged on only one side referred to the thickness direction of the partition 40. However, it would also be possible to arrange the carrier matrix reinforcing devices 60 on both sides referred to the thickness direction of the partition 40.

Figure 16:
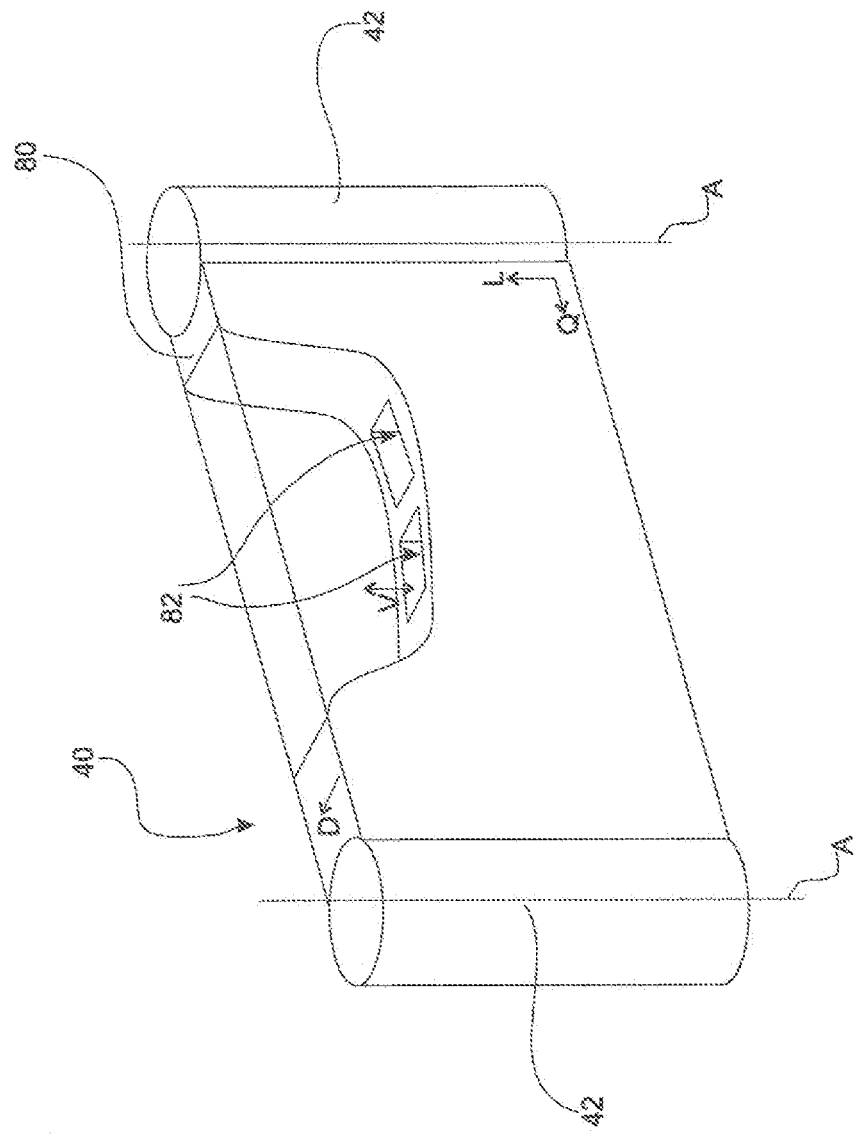
FIG. 16 shows another embodiment of an inventive partition in the form of an isometric view.

FIG. 16 shows an alternative embodiment of a partition 40. In this embodiment, pockets 82 are provided in the interior of the carrier matrix 80 and serve as a receptacle pockets for producing the frictional connection with carrier matrix reinforcing devices 60 that are not illustrated in this figure. The pockets are arranged in the interior of the carrier matrix 80 such that a section of the partition 40 is illustrated in a transparent fashion in FIG. 16. In this case, the reinforcing direction with respect to the reinforcement of the carrier matrix reinforcing devices 60 also extends along the longitudinal extension L of the partition 40 and therefore along the bearing axes A of the longitudinal edges 42 of the partition 40. The corresponding axes A particularly extend parallel to one another in this case.

Figure 17:
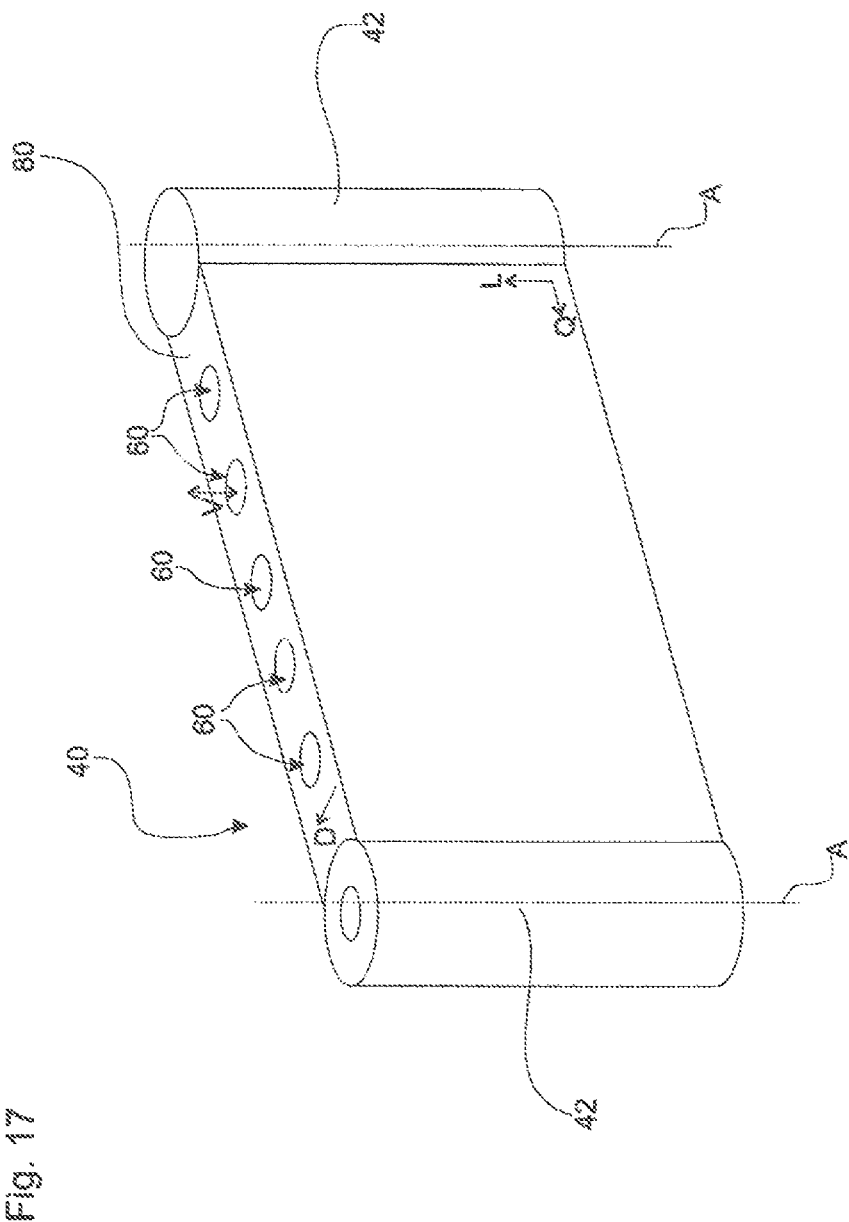
FIG. 17 shows another embodiment of an inventive partition in the form of an isometric view.

FIG. 17 shows another embodiment. In this case, a partition 40 is reinforced by means of carrier matrix reinforcing devices 60 arranged in the interior of the carrier matrix 80. This is realized with an integral manufacturing process, in which a carrier matrix 80 in the form of a thermoplastic injection moulding material is injection-moulded around inserted carrier matrix reinforcing devices 60. In this case, round carrier matrix reinforcing devices 60 also extend essentially over the entire longitudinal extension L of the partition 40, namely with a reinforcing direction V that extends along the bearing axes A of the longitudinal edges 42 of the partition 40. FIG. 17 furthermore shows that a reinforcement in the form of a carrier matrix reinforcing devices 60 is also provided within the longitudinal edge 42 on the left side of the partition 40. In special operating situations, the inventive concept of a reinforcement by means of the carrier matrix reinforcing devices 60 therefore can also be applied to the reinforcement of the longitudinal edges 42 in order to realize the bearing axes A of the partition 40.

Figure 18:
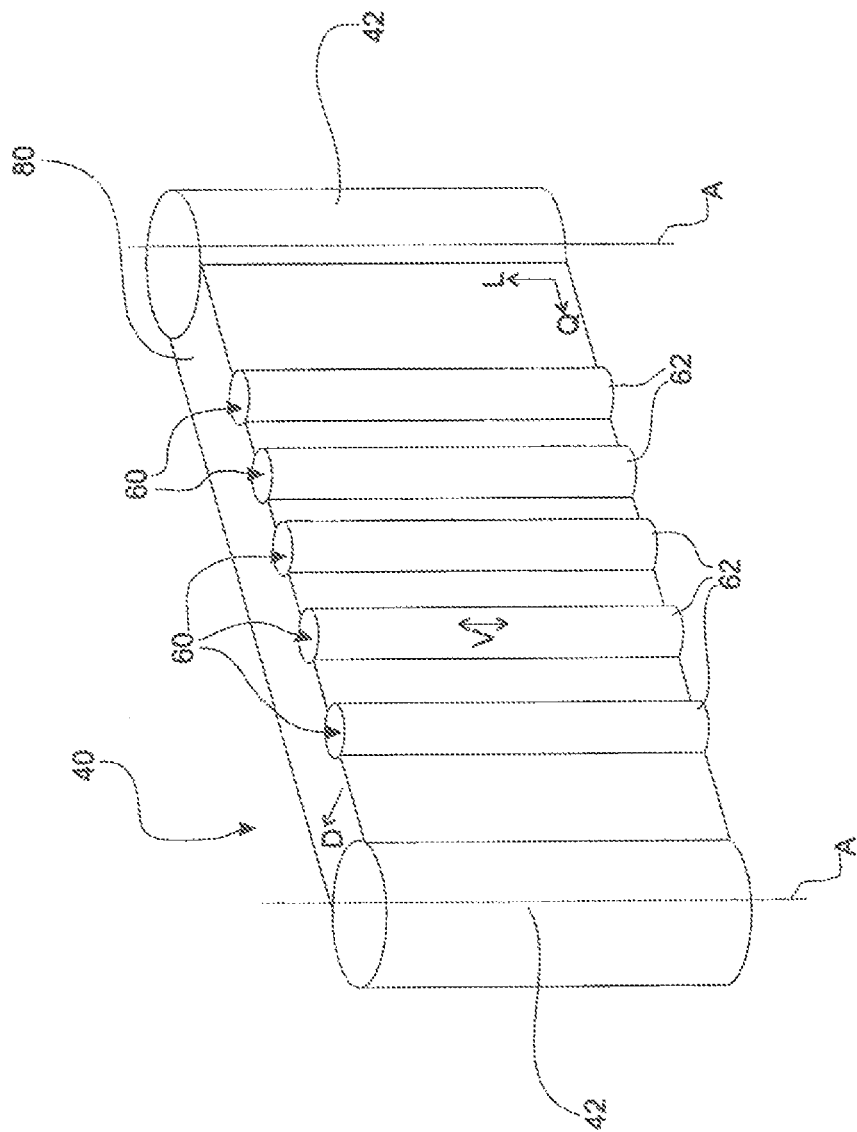
FIG. 18 shows another embodiment of an inventive partition in the form of an isometric view.

FIG. 18 shows an enhancement of FIG. 17, wherein no complete injection-moulding around the carrier matrix reinforcing devices 60 was carried out in this case. In fact, the carrier matrix reinforcing devices are only partially embedded in the carrier matrix 80. In this way, a haptical structure, as well as an optical structure, is created on the side of the partition 40, on which the reinforcing devices 60 in the form of rods 62 protrude. This optical and haptical structure improves the quality impression of the partition 40 because the technical functionality of the reinforcement is in this way haptically sensible, as well as optically visible. The reinforcing function against bending moments, the vector of which extends transverse to the bearing axes A of the longitudinal edges 42, is in this case also achieved in the same fashion as in the above-described embodiments.

Figure 19:
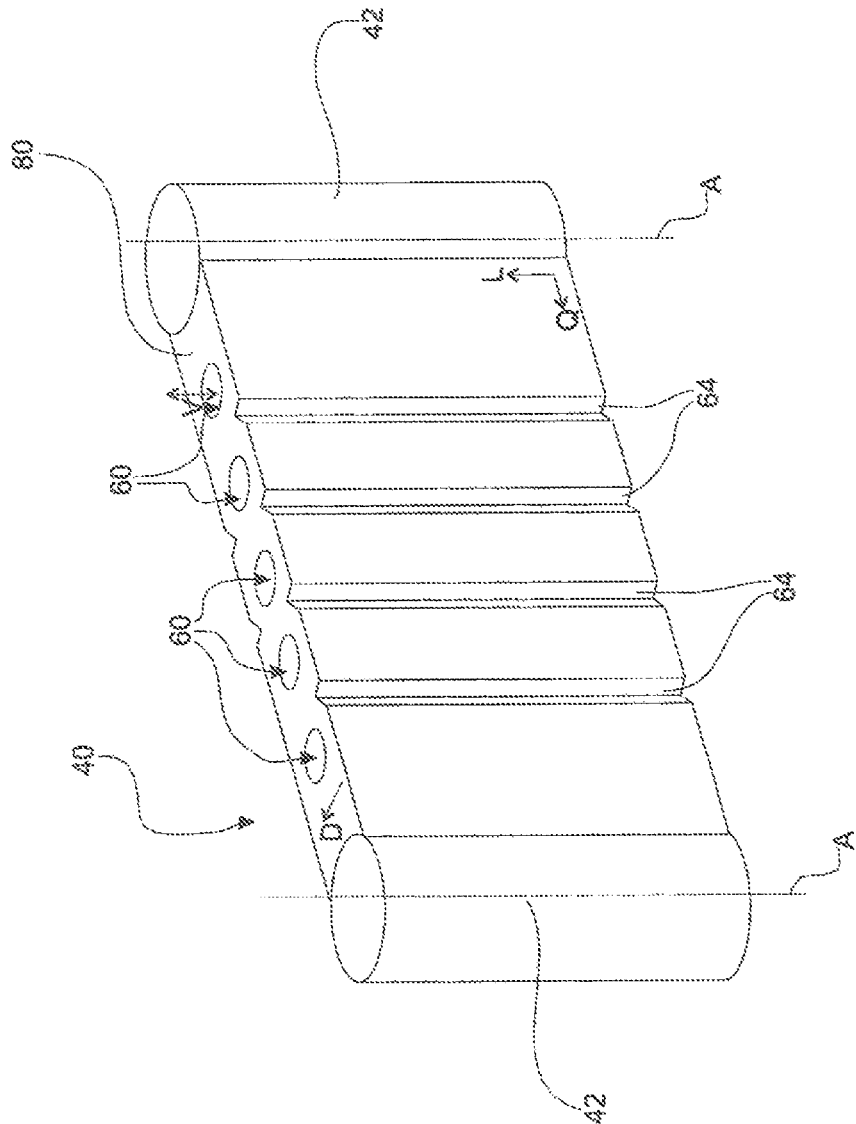
FIG. 19 shows another embodiment of an inventive partition in the form of an isometric view.

In FIG. 19, the embodiment according to FIG. 17 is enhanced to the effect that weakening grooves 64 are provided in this case. The weakening grooves 64 also essentially extend along the longitudinal direction L, i.e., essentially along the bearing axes A of the longitudinal edges 42 of the partition 40. These weakening grooves 64 serve for realizing the opposite effect of the carrier matrix reinforcing devices 60. Consequently, they serve for reducing the flexural rigidity with respect to bending moments that are respectively introduced into the partition 40 along the longitudinal direction L or along the bearing axis A of the longitudinal edges 42. In other words, the combination of weakening grooves 64 and carrier matrix reinforcing devices 60 causes the difference between the flexural rigidity in the transverse direction and the flexural rigidity in the longitudinal direction to increase. Consequently, a flexure with a torque vector extending along the longitudinal direction L is much easier than a flexure by means of a bending moment with a torque vector extending in the transverse direction Q.

Another advantageous embodiment is described below with reference to FIGS. 20a, 20b, 21a and 21b. In this embodiment, the individual carrier matrix reinforcing devices 60 also have at least two stable deformation states. In this case, the curvatures of such stable deformation states refer to curvatures, the orientation of which is essentially aligned along the longitudinal direction L of the partition 40. Consequently, a three-dimensional curvatures situation is created in this case. On the one hand, the partition 40 can be bent along the longitudinal direction L, i.e., along the bearing axes A of the longitudinal edges 42, due to the elasticity of the material of the panel-shaped carrier matrix as illustrated, for example, in FIGS. 21*a* and 21*b* in the form of two oppositely curved stable deformation states. Furthermore, the first curvature can overlap a second curvature as illustrated for the carrier matrix reinforcing devices 60 in FIGS. 20*a* and 20*b*. They can also assume two stable deformation states with opposing curvatures. During a reversal, i.e., when the partition 40 is moved from the position in the first stable deformation state according to FIG. 21*a* into the second stable deformation state according to FIG. 21*b*, it would therefore also be possible to transfer the carrier matrix reinforcing devices 60 from a first stable deformation state of the carrier matrix reinforcing devices 60 into a second stable deformation state of the carrier matrix reinforcing devices 60. Consequently, a curvature reversal not only occurs along the longitudinal direction L, but also along the transverse direction Q of the carrier matrix 80 or the partition 40, respectively. In this way, even more complex structures of receptacle devices 10 or inner walls 24 can be operated with an inventive storage device.

The above-described exemplary embodiments are merely special embodiments of the present invention, wherein the individual embodiments can be technically combined with one another in an arbitrary fashion. Consequently, the description of the individual exemplary embodiments does not restrict the scope of protection of the present invention.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. A storage device for use in a passenger compartment of a vehicle and having a receptacle space for storing objects that is formed by a bottom surface and an inner wall, the storage device comprising: at least two bearing devices that are realized on oppositely positioned regions in the inner wall and serve for accommodating lateral edge sections of a partition that flatly extends between these lateral edge sections; and the partition is accommodated by the bearing devices of the inner wall on its oppositely positioned lateral edge sections in such a way that the partition can be reversibly deformed between at least two stable deformation states with sectionally opposing curvatures such that the receptacle space is divided into separate partial receptacle spaces in at least one deformation state, wherein the partition has a carrier matrix and features at least one flexurally rigid carrier matrix reinforcing device that is realized in a form of a longitudinal profile on or through the carrier matrix and that extends transverse to a longitudinal direction (LR) of the partition, and wherein the carrier matrix comprises a first elastomeric material and the flexurally rigid carrier matrix reinforcing device comprises a second material that has a greater modulus of elasticity than the first elastomeric material.

2. The storage device according to claim 1, wherein at least one bearing device of the storage device features an overload safety device that is realized in such a way that it releases the longitudinal edge of the partition supported by the respective bearing device from the respective bearing device starting at a predefined bearing force in the direction of the longitudinal extension of the partition.

3. The storage device according to claim 2, wherein the overload safety is at least partially realized by at least one correspondingly designed bearing device and one correspondingly designed longitudinal edge of the carrier matrix of the partition.

4. The storage device according to claim 3, wherein at least one bearing device features a receptacle device realized in the respective inner wall, at least one spring element that can be inserted into the receptacle device and a catch element that is guided and can be moved in the receptacle device, wherein said catch element can be moved between a catch position and a release position against the spring force of the spring element and is prestressed into the catch position in such a way that the catch element can in its catch position be at least partially inserted into a receptacle in a longitudinal edge of the partition and supports the catch element in an articulated fashion in the engaged state thereof, and wherein the catch element can release the longitudinal edge when a defined transverse force acting upon this longitudinal edge is exceeded.

5. A storage device for use in a passenger compartment of a vehicle and having a receptacle space for storing objects that is formed by a bottom surface and an inner wall, the storage device comprising: at least two bearing devices that are realized on oppositely positioned regions in the inner wall and serve for accommodating lateral edge sections of a partition that flatly extends between these lateral edge sections; and the partition is accommodated by the bearing devices of the inner wall on its oppositely positioned lateral edge sections in such a way that the partition can be reversibly deformed between at least two stable deformation states with sectionally opposing curvatures such that the receptacle space is divided into separate partial receptacle spaces in at least one deformation state, wherein the lateral edge sections of the partition are in the form of reinforced bearing axes (A), wherein the partition has a carrier matrix that extends transverse to the longitudinal direction of the partition, wherein the partition features at least one flexurally rigid carrier matrix reinforcing device that is realized in a form of a longitudinal profile on or through the carrier matrix and that extends transverse to a longitudinal direction (LR) of the partition in order to increase the flexural rigidity of the partition against bending moments, a moment axes of which extend transverse to axial directions of the bearing axes (A), in comparison with a flexural rigidity of the carrier matrix, and wherein the elastic material of the carrier matrix has a modulus of elasticity, at which the regions of the carrier matrix that lie between the longitudinal profiles exert such a restoring force when they are deformed that the partition can assume at least two altogether stable deformation states with at least sectionally opposing curvature profiles when the lateral edge sections are inserted into the bearing devices of the inner wall of the storage device in order to divide the receptacle space of the storage device into different sizes.

6. The storage device according to claim 5, wherein a frictional connection between the at least one flexurally rigid carrier matrix reinforcing device and the carrier matrix at least sectionally comprises a positive-fit connection.

7. The storage device according to claim 5, wherein a frictional connection between the at least one flexurally rigid carrier matrix reinforcing device and the carrier matrix at least sectionally comprises a mechanical connection.

8. The storage device according to claim 5, wherein the carrier matrix features weakening grooves that extend along the bearing axes (A) of the carrier matrix within a flat extension thereof such that a flexural rigidity of the carrier matrix of an elastic partition against bending moments with a moment axis extending along the bearing axis (A) is reduced.

9. The storage device according to claim 5, wherein the at least one carrier matrix reinforcing device can be reversibly deformed between a first and a second deformation state, wherein the two deformation states differ with respect to their curvature along the bearing axis (A) of the carrier matrix.

10. The storage device according to claim 5, wherein the at least one carrier matrix reinforcing device comprises a rod with constant cross section.

11. The storage device according to claim 5, wherein an elastic material of the carrier matrix comprises silicone rubber, ethylene-propylene-diene rubber (EPDM), thermoplastic elastomer (TPE), plastic, textile material, metal foil, sheet metal, leather strap with return spring, or combinations thereof.

12. The storage device according to claim 5, wherein the carrier matrix reinforcing device is at least partially made of polyamide.

13. The storage device according to claim 5, wherein the longitudinal edges of the carrier matrix are adapted to a support in the bearing devices in the storage device in such a way that the partition can be supported in the bearing devices in an articulated fashion about the bearing axis (A).

* * * * *